(12) United States Patent
Yamada et al.

(10) Patent No.: US 6,564,231 B1
(45) Date of Patent: *May 13, 2003

(54) METHOD FOR MANAGING OPTICAL DISK LIBRARY FILES IN ACCORDANCE WITH THE FREQUENCY OF PLAYBACK REQUESTS SELECTED SIMULTANENOUSLY AT A SPECIFIED TIME INTERVALS

(75) Inventors: Takahiro Yamada, Kadomashi; Masashi Yamaguchi, Osakashi, both of (JP)

(73) Assignee: Matsushita Electric Industrial Co., Ltd. (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 417 days.

(21) Appl. No.: 08/955,704

(22) Filed: Oct. 23, 1997

(30) Foreign Application Priority Data

Oct. 24, 1996 (JP) .............................................. 8-282137

(51) Int. Cl.[7] .............................................. G06F 17/30
(52) U.S. Cl. ............................ 707/201; 707/2; 707/204; 711/150; 711/161; 711/162
(58) Field of Search .............................. 707/1, 2, 3, 6, 707/7, 10, 104, 200, 201, 202, 203, 204, 205, 206; 348/7, 12, 13, 401, 6, 412, 154, 97, 384, 405, 414; 395/200.49, 200.61; 386/109, 111, 131, 46; 711/112, 111, 114, 161–162, 150–151, 171, 173

(56) References Cited

U.S. PATENT DOCUMENTS

| | | | | |
|---|---|---|---|---|
| 5,214,768 A | * | 5/1993 | Martin et al. ................ | 711/114 |
| 5,388,260 A | * | 2/1995 | Monahan et al. .............. | 711/1 |
| 5,550,577 A | * | 8/1996 | Verbiest et al. ................ | 348/7 |
| 5,606,359 A | * | 2/1997 | Youden et al. ................. | 348/7 |
| 5,630,067 A | * | 5/1997 | Kindell et al. ......... | 395/200.09 |
| 5,644,714 A | * | 7/1997 | Kikinis .................. | 395/200.49 |
| 5,724,552 A | * | 3/1998 | Taoda ......................... | 711/165 |
| 5,790,176 A | * | 8/1998 | Craig .......................... | 348/13 |
| 5,809,547 A | * | 9/1998 | Taoda ......................... | 711/165 |
| 5,832,499 A | * | 11/1998 | Gustman .................... | 707/103 |

FOREIGN PATENT DOCUMENTS

JP          8-54991          2/1996

* cited by examiner

Primary Examiner—Jack Choules
Assistant Examiner—Srirama Channavajjala
(74) Attorney, Agent, or Firm—Parkhurst & Wendel, L.L.P.

(57) ABSTRACT

A method for managing files in a library in a manner to access files in a library operating with a plurality of preservation recording media storing data as files, while copying data more highly required to be reproduced to another storage device of high-speed access, including recording a playback request of the file when required; creating frequency information of the playback request of each file according to the playback request; and copying a file that is judged to have very frequent playback request, at specified time intervals or when the number of the playback requests reaches a specified value. Therefore, more requests from terminal units can be accepted to transmit files than when copied only to a hard disk as the storage device of high-speed access.

4 Claims, 32 Drawing Sheets

Fig.3
playback request records 21 time ↓

| | |
|---|---|
| 51 | 29 playback request and request time of file 7 |
| | 30 playback request and request time of file 8 |
| | 31 playback request and request time of file 8 |
| | 32 playback request and request time of file 8 |
| | 33 playback request and request time of file 9 |
| | 34 playback request and request time of file 8 |
| | 35 playback request and request time of file 9 |
| | 36 playback request and request time of file 8 |
| | 37 playback request and request time of file 9 |
| | 38 playback request and request time of file 9 |
| | 39 playback request and request time of file 8 |
| | 40 playback request and request time of file 8 |
| | 41 playback request and request time of file 8 |
| | 42 playback request and request time of file 8 |
| | 43 playback request and request time of file 7 |
| | 44 playback request and request time of file 8 |
| | 45 playback request and request time of file 9 |
| | 46 playback request and request time of file 8 |
| | 47 playback request and request time of file 9 |
| | 48 playback request and request time of file 8 |
| | 49 playback request and request time of file 8 |
| | 50 playback request and request time of file 9 |
| 52 | |

Fig.4

53a file management information 22 (before copying)

| 54 file name | 55 disk name including file | 56 presence of copy on hard disk | 57 disk name including copy of file |
|---|---|---|---|
| file 7 | disk 2 | no copy | no copy |
| file 8 | disk 3 | no copy | no copy |
| file 9 | disk 4 | no copy | no copy |
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |

53b file management information 22 (after copying)

| 54 file name | 55 disk name including file | 56 presence of copy on hard disk | 57 disk name including copy of file |
|---|---|---|---|
| file 7 | disk 2 | no copy | no copy |
| file 8 | disk 3 | copied | no copy |
| file 9 | disk 4 | no copy | disk 5 |
| ⋮ | ⋮ | ⋮ | ⋮ |
| ⋮ | ⋮ | ⋮ | ⋮ |
| ⋮ | ⋮ | ⋮ | ⋮ |
| ⋮ | ⋮ | ⋮ | ⋮ |

Fig.10

60a file copy set information (before copying)

| 61 file name | 62 disk where file is copied | 63 presence of copy on disk |
|---|---|---|
| file 8 | hard disk | no copy |
| file 9 | disk | no copy |
| ⋮ | ⋮ | ⋮ |
| | | |
| | | |
| | | |

60b file copy set information (after copying)

| 61 file name | 62 disk where file is copied | 63 presence of copy on disk |
|---|---|---|
| file 8 | hard disk | copied |
| file 9 | disk | copied |
| ⋮ | ⋮ | ⋮ |
| | | |
| | | |
| | | |

Fig.12
playback
request
records 21 time ↓

97 {
| |
|---|
| 64 playback request and request time of file 7 |
| 65 playback request and request time of file 9 |
| 66 playback request and request time of file 9 |
| 67 playback request and request time of file 8 |
| 68 playback request and request time of file 9 |
| 69 playback request and request time of file 9 |
| 70 playback request and request time of file 9 |
| 71 playback request and request time of file 9 |
| 72 playback request and request time of file 9 |
| 73 playback request and request time of file 9 |
| 74 playback request and request time of file 9 |
| 75 playback request and request time of file 9 |
| 76 playback request and request time of file 9 |
| 77 playback request and request time of file 9 |
| 78 playback request and request time of file 7 |
| 79 playback request and request time of file 9 |
| 80 playback request and request time of file 9 |
| 81 playback request and request time of file 7 |
| 82 playback request and request time of file 9 |
| 83 playback request and request time of file 9 |
| 84 playback request and request time of file 8 |
| 85 playback request and request time of file 9 |
| 86 playback request and request time of file 7 |
| 87 playback request and request time of file 8 |
| 88 playback request and request time of file 8 |
| 89 playback request and request time of file 8 |
| 90 playback request and request time of file 8 |
| 91 playback request and request time of file 9 |
| 92 playback request and request time of file 8 |
| 93 playback request and request time of file 8 |
| 94 playback request and request time of file 9 |
| 95 playback request and request time of file 8 |
| 96 playback request and request time of file 8 |

} 98

| Fig.13 |
|---|
| Fig.13 (a) |
| Fig.13 (b) |

Fig. 13 (a)

playback request records 21

| time → | |
|---|---|
| 64 | playback request and request time of file 7 |
| 65 | playback request and request time of file 9 |
| 66 | playback request and request time of file 9 |
| 67 | playback request and request time of file 8 |
| 68 | playback request and request time of file 9 |
| 69 | playback request and request time of file 9 |
| 70 | playback request and request time of file 9 |
| 71 | playback request and request time of file 9 |
| 72 | playback request and request time of file 9 |
| 73 | playback request and request time of file 9 |
| 74 | playback request and request time of file 9 |
| 75 | playback request and request time of file 9 |
| 76 | playback request and request time of file 9 |
| 77 | playback request and request time of file 9 |
| 78 | playback request and request time of file 7 |
| 79 | playback request and request time of file 9 |
| 80 | playback request and request time of file 9 |

playback request records 21

| time → | |
|---|---|
| 81 | playback request and request time of file 7 → counted as double playback requests |
| 82 | playback request and request time of file 9 → counted as double playback requests |
| 83 | playback request and request time of file 9 → counted as double playback requests |
| 84 | playback request and request time of file 8 → counted as double playback requests |
| 85 | playback request and request time of file 9 → counted as double playback requests |
| 86 | playback request and request time of file 7 → counted as double playback requests |
| 87 | playback request and request time of file 8 → counted as double playback requests |
| 88 | playback request and request time of file 8 → counted as double playback requests |
| 89 | playback request and request time of file 8 → counted as double playback requests |
| 90 | playback request and request time of file 8 → counted as double playback requests |
| 91 | playback request and request time of file 9 → counted as double playback requests |
| 92 | playback request and request time of file 8 → counted as double playback requests |
| 93 | playback request and request time of file 8 → counted as double playback requests |
| 94 | playback request and request time of file 9 → counted as double playback requests |
| 95 | playback request and request time of file 8 → counted as double playback requests |
| 96 | playback request and request time of file 8 → playback requests |

Fig.16
simultaneous playback
request records 100

| time ↓ | |
|---|---|
| | 101 simultaneous playback requests and request times of file 8 and its copy |
| | 102 simultaneous playback requests and request times of file 8 and its copy |
| | 103 simultaneous playback requests and request times of file 9 and its copy |
| | 104 simultaneous playback requests and request times of file 8 and its copy |
| | 105 simultaneous playback requests and request times of file 8 and its copy |
| 111 | 106 simultaneous playback requests and request times of file 8 and its copy |
| | 107 simultaneous playback requests and request times of file 9 and its copy |
| | 108 simultaneous playback requests and request times of file 8 and its copy |
| | 109 simultaneous playback requests and request times of file 8 and its copy |
| | 110 simultaneous playback requests and request times of file 9 and its copy | disk copy information 116

Fig.21 (a)   initial state

| disk 5 | disk 6 | disk 112 |
|--------|--------|----------|
| 0      | 0      | 0        |

Fig.21 (b)   after copying file 7

| disk 5 | disk 6 | disk 112 |
|--------|--------|----------|
| 3      | 2      | 1        |

Fig.21 (c)   after copying file 8

| disk 5 | disk 6 | disk 112 |
|--------|--------|----------|
| 3      | 2      | 4        |

Fig.21 (d)   after copying file 9

| disk 5 | disk 6 | disk 112 |
|--------|--------|----------|
| 3      | 5      | 4        | file management information 22

Fig.22 (a)  initial state

| file name | disk name including file | presence of copy on hard disk | disk names including copies of file and priority levels of disk in recording and playback | | |
|---|---|---|---|---|---|
| | | | 1 | 2 | 3 |
| file 7 | disk 2 | no copy | no copy | no copy | no copy |
| file 8 | disk 3 | no copy | no copy | no copy | no copy |
| file 9 | disk 4 | no copy | no copy | no copy | no copy |
| ⋮ | ⋮ | ⋮ | ⋮ | ⋮ | ⋮ |
| ⋮ | ⋮ | ⋮ | ⋮ | ⋮ | ⋮ |

Fig.22 (b)  after copying file 7

| file name | disk name including file | presence of copy on hard disk | disk names including copies of file and priority levels of disk in recording and playback | | |
|---|---|---|---|---|---|
| | | | 1 | 2 | 3 |
| file 7 | disk 2 | no copy | disk 5 | disk 6 | disk 112 |
| file 8 | disk 3 | no copy | no copy | no copy | no copy |
| file 9 | disk 4 | no copy | no copy | no copy | no copy |
| ⋮ | ⋮ | ⋮ | ⋮ | ⋮ | ⋮ |
| ⋮ | ⋮ | ⋮ | ⋮ | ⋮ | ⋮ | file management information 22

Fig.22 (c)  after copying file 8

| file name | disk name including file | presence of copy on hard disk | disk names including copies of file and priority levels of disk in recording and playback | | |
|---|---|---|---|---|---|
| | | | 1 | 2 | 3 |
| file 7 | disk 2 | no copy | disk 5 | disk 6 | disk 112 |
| file 8 | disk 3 | no copy | disk 112 | no copy | no copy |
| file 9 | disk 4 | no copy | no copy | no copy | no copy |
| ⋮ | ⋮ | ⋮ | ⋮ | ⋮ | ⋮ |
| ⋮ | ⋮ | ⋮ | ⋮ | ⋮ | ⋮ |

Fig.22 (d)  after copying file 9

| file name | disk name including file | presence of copy on hard disk | disk names including copies of file and priority levels of disk in recording and playback | | |
|---|---|---|---|---|---|
| | | | 1 | 2 | 3 |
| file 7 | disk 2 | no copy | disk 5 | disk 6 | disk 112 |
| file 8 | disk 3 | no copy | disk 112 | no copy | no copy |
| file 9 | disk 4 | no copy | disk 6 | no copy | no copy |
| ⋮ | ⋮ | ⋮ | ⋮ | ⋮ | ⋮ |
| ⋮ | ⋮ | ⋮ | ⋮ | ⋮ | ⋮ | file management information 22

Fig.23 (a)   initial state

| file name | disk name including file | file name when copied to hard disk | disk name including copy of file and its file name |
|---|---|---|---|
| file 7 | disk 2 | no copy | no copy |
| file 8 | disk 3 | no copy | no copy |
| file 9 | disk 4 | no copy | no copy |

Fig.23 (b)   after copying file 9 to disk 5

| file name | disk name including file | file name when copied to hard disk | disk name including copy of file and its file name |
|---|---|---|---|
| file 7 | disk 2 | no copy | no copy |
| file 8 | disk 3 | no copy | no copy |
| file 9 | disk 4 | no copy | disk5／file9-DISK5 |

Fig.23 (c)   after copying file 9 to hard disk

| file name | disk name including file | file name when copied to hard disk | disk name including copy of file and its file name |
|---|---|---|---|
| file 7 | disk 2 | no copy | no copy |
| file 8 | disk 3 | no copy | no copy |
| file 9 | disk 4 | file9-HDD | disk5／file9-DISK5 |

Fig.25 (a) time t
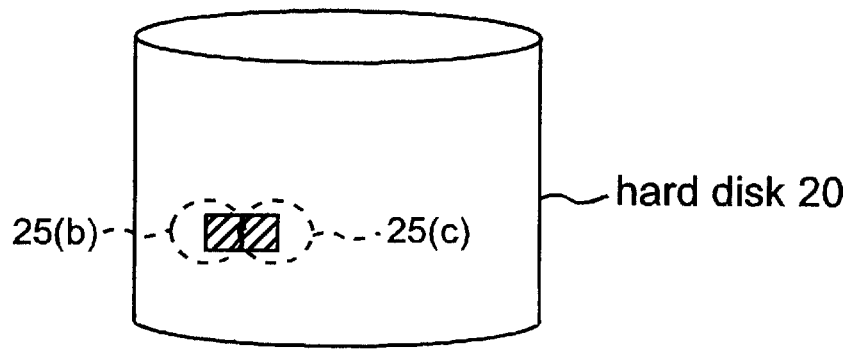
Fig.25 (b)
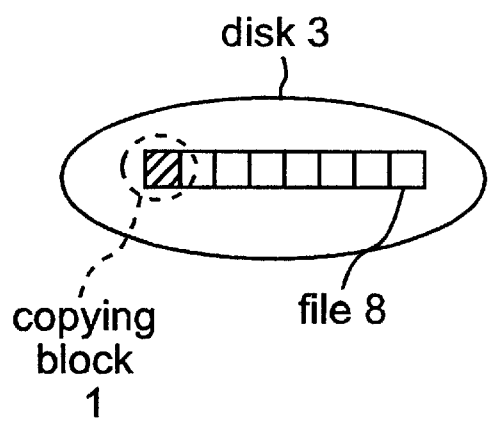
Fig.25 (c)
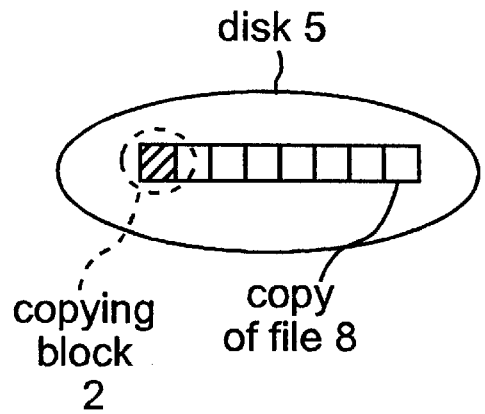

Fig.26 (a) time 2t
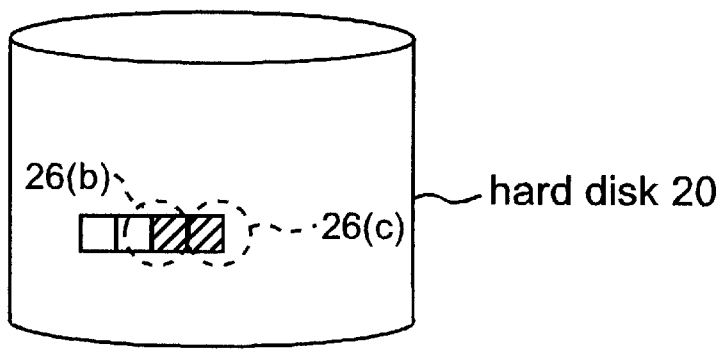
Fig.26 (b)
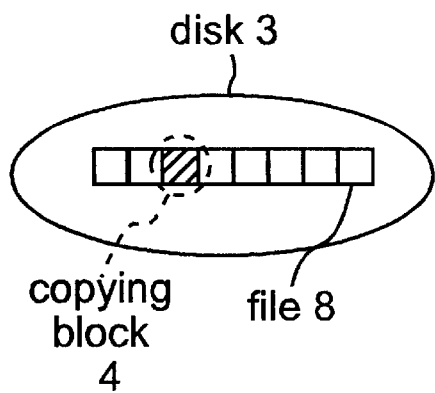
Fig.26 (c)
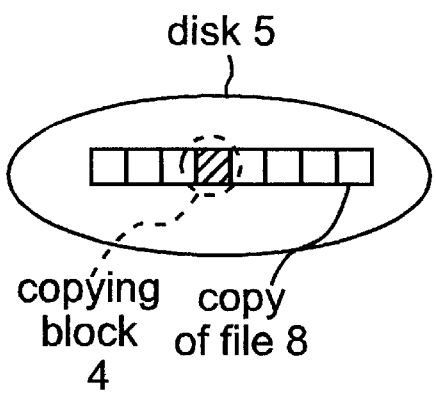

Fig.27 (a) time t
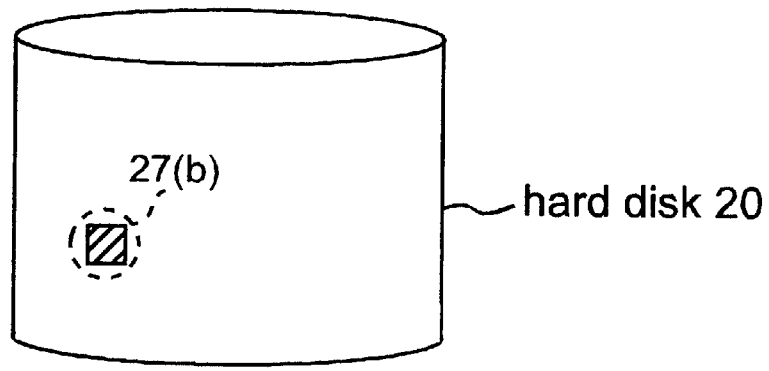
hard disk 20
Fig.27 (b)
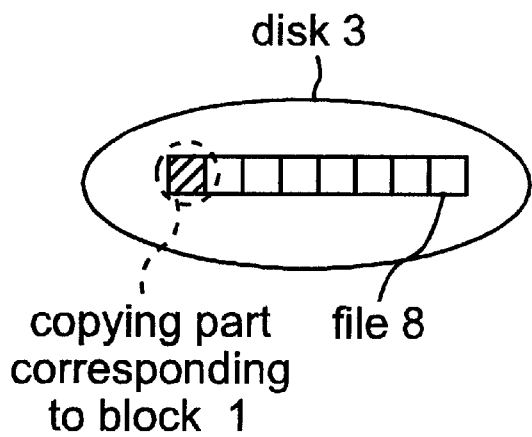
copying part     file 8
corresponding
to block 1
Fig.27 (c)
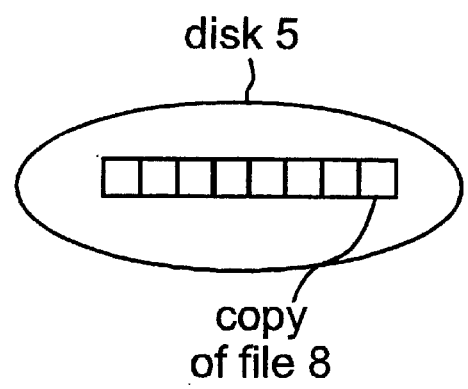
copy
of file 8

Fig.28 (a) time 2t
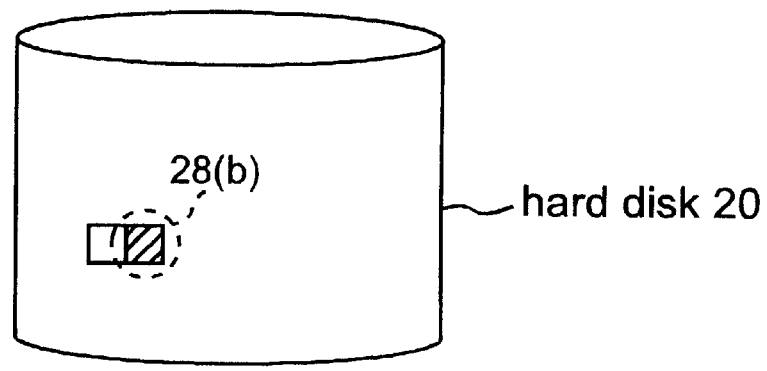
Fig.28 (b)
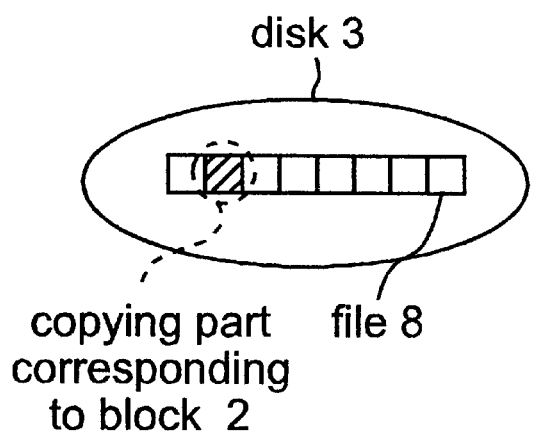
Fig.28 (c)
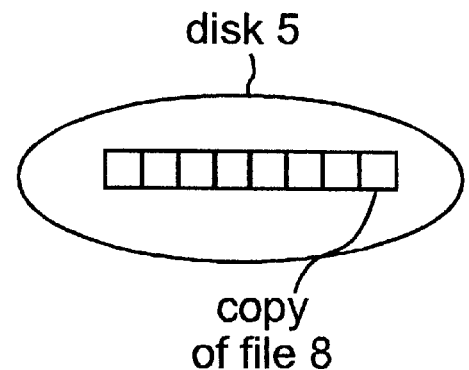

METHOD FOR MANAGING OPTICAL DISK LIBRARY FILES IN ACCORDANCE WITH THE FREQUENCY OF PLAYBACK REQUESTS SELECTED SIMULTANENOUSLY AT A SPECIFIED TIME INTERVALS

FIELD OF THE INVENTION

The present invention relates to a method for managing files in a library including a plurality of recording media that record data as files. Further, the invention relates to a server device for library which is provided with a library including a plurality of recording media that record data as files, and distributes the data to a plurality of terminal units connected through a network.

BACKGROUND OF THE INVENTION

In computers of late years, processing speed is higher, and spread of mass storage devices increases the amount of data that can be handled. As a device for storing mass data including character information, audio, moving pictures and the like, and regenerating or playing back the data according to requests of a plurality of terminal units, a server for library has received attention. Generally, file servers distribute data to a plurality of terminals through a network. Among such file servers, a server for library has a library including a plurality of recording media that are relatively low-priced and of large capacity, such as optical disks, as a main storage device, and has been expected in uses for handling mass data, such as multimedia.

A description is given of a conventional server for library that handles moving picture data.

FIG. 27 is a diagram illustrating a conventional network system having a library. Reference numeral 1 designates a library, and the library 1 keeps many disks, such as optical disks, as recording media that record data. Reference numerals 2 to 6 designate disks that record data, and the recorded data are treated as files. Reference numeral 11 designates a disk storage unit that stores the disks. Reference numerals 12 to 15 designate drives for inserting the disks and performing record and playback. Reference numeral 16 designates an arm for inserting/removing the disks into/from the disk storage unit 11 and the drives 12 to 15 and conveying the disks. Reference numeral 17 designates an arm control unit for controlling the operation of the arm 16. Reference numeral 18 designates a bus for transferring data of the disks that are inserted into the drives 12 to 15 and transferring control data to the arm control unit 17. Reference numeral 19 designates a server for library utilizing a personal computer or a work station. Reference numeral 20 designates a hard disk that records contents of the disks in the library 1, records of requests from terminal units, playback request frequency information on the basis of the request records and the like. This hard disk 20 is a storage device that can access the disks in the library 1 at high speed. Reference numeral 24 designates a network that is connected to the server 19, and numerals 25 to 28 designate terminal units that read out the files in the server 19 through the network 24. In this case, the data recorded on the disks are moving picture files which are rapidly increasing in recent years, and in order to perform continuous playback, the data should be transferred at a constant transfer rate or more.

A description is given of the operation when the server for library 19 with the construction described above plays back a file that is recorded on a disk in the library 1, according to a request from a terminal unit.

One of the terminal units 25 to 28 specifies a file name of a file to be played back and makes a playback request of the file to the server 19 Through the network 24. Referring to the contents of the disks in the library 1 that are recorded on the hard disk 20, the server 19 reads out information of the files recorded on the disks 2 to 6, and examines which of tho disks has the desired file. Then, when finding information of the desired file, the server 19 transfers control data to the arm control unit 17 of the library 1 through the bus 18. In the library 1, the arm control unit 17 moves the arm 16 according to the control data. The arm 16 removes tile disk including the desired file from the disk storage unit 11 to convey and insert the disk into one of the drives 12 to 15.

When readout of the desired file in the disk starts, tell server 19 adds a network address to the data to output the data with the network address to the network 24. The terminal unit. that has requested the file with the same network address receives this data to perform playback of the data.

In such a construction, when files in disks are read out and transferred to terminal units, disks in a library that can be removed from drives are generally lower in access speed than a hard disk or the like. In addition, in order to continuously playback specified moving picture data, it is required to transfer the data at a constant transfer rate or more. Therefore, in a case of media in which the access speed is low, such as the disks in the library, when a plurality of files in one disk are simultaneously read out, the transfer rate is not satisfactory for playback of moving picture data because of the slow readout. As a result, in playing back the moving picture data in terminal units, there occur the defects that, for example, the moving pictures impermanently stop. Consequently, it is usual to set the number of simultaneous readout files in one disk, which number is capable of transferring the moving pictures without producing the defects in the terminal units. Generally, the number of simultaneous readout files is set to 1. That is, concerning the disks in the library, a plurality of files in one disk cannot be simultaneously read out.

Meanwhile, concerning data that are recorded in a storage device in which the readout speed is high, such as a hard disk, it is possible to read out and transfer a plurality of files in the identical modium according to a plurality of playback requests, and perform continuous regeneration.

In a conventional server device, in order to accept requests from a plurality of terminal units as many as possible, a part of files that are retained in a library is copied to a hard disk. More specifically, the server device keeps records of the files that have received playback requests from the terminal units, in the hard disk, and frequency information about playback request frequency of the files in the library is created at regular intervals on the basis of the records of the playback requests. The files of high frequency in playback request are copied from the disks including tho files to the hard disk. Thereby, the plurality of files are read out of the hard disk in which the access speed is high to output moving pictures to the terminal units.

Further, for example, as disclosed by Japanese Published Patent Application No. Hei. 8-54991, one of disk media that has been read/written is left as it is inserted into a drive, and when data in the disk medium receive an access request, the data can be read/written immediately, thereby improving the access performance.

In the conventional server for library constructed as described above, the files of high frequency in playback request from the terminal units are successively copied from the disks to the hard disk. However, since the capacity of the hard disk is smaller than the capacity of the library, the hard disk is full of the files in a short time, failing to copy the files any more. In order to avoid this problem, among the files that have been copied to the hard disk, the files of low frequency in playback request are erased. As a result, however, only very few files of the files that have been retained in the library can be copied and retained in the hard disk, so that acceptance of the requests from the plurality of terminal units is restricted depending on the capacity of the hard disk.

Even when the operator of the server for library predicts that a file that is newly recorded in the library will receive many playback requests, or that a file will receive few playback requests in the future, there is no means of reflecting the prediction, and the operator only waits an increase or reduction in the playback request frequency. Therefore, acceptance of the requests from the plurality of terminal units is delayed, so That the server cannot be operated with good efficiency with the prediction by the operator made the best of.

Further, in determining whether the moving picture files in the disks are copied or not according to the frequency information of the file playback requests from the terminal units, the number of file playback requests in a prescribed time is usually used as the frequency information. Therefore, when a file has recently received suddenly increasing playback requests although the absolute number of the file playback requests in a prescribed time is not so large, the file is not copied until the requests of the file satisfactorily increase. Consequently, the moving pictures are not transferred simultaneously to the plurality of terminal units until that, thereby delaying acceptance of the requests.

Furthermore, if it is determined whether the files are copied or not according to only the playback request frequency, tie server copies a file that has been requested from the identical terminal unit many times, and does not copy a file that has often received requests from the plurality of terminal units at the identical time although the absolute number of the requests is not so large. As a result, the substance of the requests from the plurality of terminal units may be taken into consideration.

Furthermore, when the moving picture file in the disk is copied to the hard disk, the access speed of the hard disk is high and the access speed of the disk is lower than that of the hard disk. Therefore, the time required for copying the file to the hard disk depends on the access speed of the disk, resulting in long time for copying.

SUMMARY OF THE INVENTION

It is an object of the present invention to provide a method for managing files in a library and a server device for library, in which more requests from a plurality of terminal units can be accepted utilizing a library of larger capacity, regardless of limitation of the capacity of a storage device of high-speed access, such as a hard disk, in copying files in the library.

Another object of the present invention is to provide a method for managing files in a library and a server device for library, in which copies of files in a library can be created or erased according to instructions by the operator when an increase or reduction in requests of the files from terminal units is predicted, thereby operating the server more flexibly and more efficient.

Further object of the present invention is to provide a method for managing files in a library and a server device for library, in which files that have received increasing requests in time rear the present time can be copied with priority given, thereby accepting requests from a plurality of terminal units earlier.

Still further object of the present invention is to provide a method for managing files in a library and a server device for library, in which files that have often received simultaneous playback requests can be copied with priority given, thereby accepting requests from a plurality of terminal units more flexibly.

Still further object of the present invention is to provide a method for managing files in a library and a server device for library, in which files in a library can be copied to a hard disk in a shorter time by making the best of high-speed access of the hard disk.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of the present invention, a method for managing files in a library with a manner to access files in a library operating with a plurality of preservation recording media or recording/playback devices storing data as files, while copying data more highly required to be reproduced to another storage device of high-speed access, the method comprising the steps of:

recording a playback request of said file when is required;

creating frequency information of playback request of each file according to said playback request; and copying a file which is judged that it has very frequent playback requests compared to other files recorded in said preservation recording media according to said frequency information of playback request, at specified time intervals or when the number of said playback requests reaches a specified value.

According to a second aspect of the present invention, a method for managing files in a library of the claim 1 wherein: files in said preservation recording media are copied to another preservation recording medium according to instruction of the operator.

According to a third aspect of the present invention, a method for managing files in a library of the claim 1 wherein: said frequency information of regeneration request is changed according to instruction of the operator.

According to a fourth aspect of the present invention, a method for managing files in a library of the claim 1 wherein: said copying step is performed according to said frequency information of playback request in the case that a plurality of set of said specified time interval or said specified value of playback requests are used.

According to a fifth aspect of the present invention, a method for managing files in a library of the claim 1 wherein: when a file is required for another reproduction at the same time the file is already being reproduced according to the playback request, this tact is recorded as simultaneous playback request, the frequency information of said simultaneous playback request of the file is created according to said recorded simultaneous playback request; thereafter, according to said frequency information of playback request and said frequency information of simultaneous playback request, said copying step is performed.

According to a sixth aspect of the present invention, a method for managing files in a library of the claim 1 wherein: when a file recorded in a preservation recording medium is copied to another preservation recording medium in said library, a new name is given to said file and the relationship between the file name in said preservation recording medium and the file name of said another preservation recording medium is stored; and a file is selected when there is a regeneration request, referring to said relationship between said filenames.

According to a seventh aspect of the present invention, a method for managing files in a library of the claim 1 wherein: when copies and plays back files in said plurality of preservation recording media, priority of performance is determined.

According to an eighth aspect of the present invention, a method for managing files in a library of the claim 1 wherein: when a file in said library recorded in a preservation recording medium is copied to said storage device of high-speed access, if the same file as said file is already copied to another preservation recording medium, said files are in parallel read out from said preservation recording medium and said another preservation recording medium respectively and then copied to said storage device of high-speed access.

According to a ninth aspect of the present invention, a server device for library which has a library operating a plurality of preservation recording media storing data as files and transfer said data to a plurality of terminal apparatuses connected to said server via networks, the server device for library comprising:

storage device of high-speed access for reading out and writing data from and to said preservation recording media playback request management unit for recording a playback request when said terminal apparatus requires said reproduction, and creating frequency information of said playback request from said terminal apparatus according to said storage of said playback request;

file management unit for copying a file which is judged that it has very frequent playback requests compared to other files recorded in said preservation recording media according to said frequency information of playback requests, at specified time intervals or when the number of said playback requests reaches a specified value; and readout control unit for reading out files from said preservation recording media and said storage devices of high-speed access.

According to a tenth aspect of the present invention, a server device for library wherein: input means for receiving instruction of the operator is provided; and said file management unit copies files stored in preservation recording media to another storage medium in said library according to instruction of the operator received by said input means.

According to an eleventh aspect of the present invention, a server device for library wherein: input means for receiving instruction of the operator is provided; and said regeneration request management unit changes said frequency information of playback request according to instruction of the operator received by said input means.

According to a twelfth aspect of the present invention, a server device for library wherein: said file management unit performs said copying step according to said frequency information of playback request in the case that a plurality of set of said specified time interval or said specified value of playback requests are used.

According to a thirteenth aspect of the present invention, a server device for library wherein: in said playback request management unit, when a file is required for another playback at the same time the file is already being played back according to the playback request from a terminal apparatus, this fact is recorded as simultaneous playback request, the frequency information of said simultaneous request of the file is created according to said recorded simultaneous playback request; thereafter, according to said said frequency information of playback request and said frequency information of simultaneous playback request, said copying step is performed.

According to a fourteenth aspect of the present invention, a server device for library wherein: in said file management unit, when a file recorded in a preservation recording medium is copied to another preservation recording medium in said library, a new name is given to said file and the relationship between the file name in said preservation recording medium and the file name of said another preservation recording medium is stored; and a file is selected when there is a playback request, referring to said relationship between said filenames.

According to a fifteenth aspect of the present invention, a server device for library wherein: in said file management unit, when copies and played back files in said plurality of preservation recording media, priority of performance is determined.

According to a sixteenth aspect of the present invention, a server device for library wherein: in said file management unit, when a file in said library recorded in a preservation recording medium is copied to said storage device of high-speed access, if the same file as said file is already copied to another preservation recording medium, said files are in parallel read out from said preservation recording medium and said another preservation recording medium respectively and then copied to said storage device of high-speed access.

BRIEF DESCRIPTION OF THE DRAWINGS

FIG. 3 is a diagram illustrating records of file playback requests from terminal units according to the first embodiment of the invention.

FIG. 4 is a diagram illustrating states of file management information according to the first embodiment of the invention.

FIG. 10 is a diagram illustrating states of file copy set information according to the third embodiment of the invention.

FIG. 12 is a diagram illustrating records of file playback requests from terminal units in accordance with a fifth embodiment of the present invention.

FIGS. 13A, and 13B are diagrams illustrating records of file playback requests from terminal units according to a modification of the fifth embodiment of the invention.

FIG. 16 is a diagram illustrating records of file simultaneous playback requests from terminal units according to the sixth embodiment of the invention.

FIGS. 21(a) to 21(d) are diagrams illustrating states of disk copy information according to the seventh embodiment of the invention.

FIGS. 22(a) to 22(d) are diagrams illustrating states of file management information according to the seventh embodiment of the invention.

FIGS. 23(a) to 23(c) are diagrams illustrating states of file management information in accordance with an eighth embodiment of the present invention.

FIGS. 25(a), 25(b), and 25(c) are diagrams for explaining a method for copying a file to a hard disk according to the ninth embodiment of the invention.

FIGS. 26(a), 26(b), and 26(c) are diagrams for explaining a method for copying a file to a hard disk according to the first embodiment of the invention, for comparison.

FIG. 27 is a diagram illustrating a conventional network system.

FIG. 28 is a flow chart for explaining a method for managing files in a library and the operation of a server device for library according to the first embodiment of the invention.

DETAILED DESCRIPTION OF THE PREFERRED EMBODIMENTS

Embodiment 1

In a server for library according to a first embodiment of the present invention, files that are recorded on disks in a library are copied to other disks in the library and a hard disk according to regeneration request frequency from terminal units, respectively.

Figure 1:
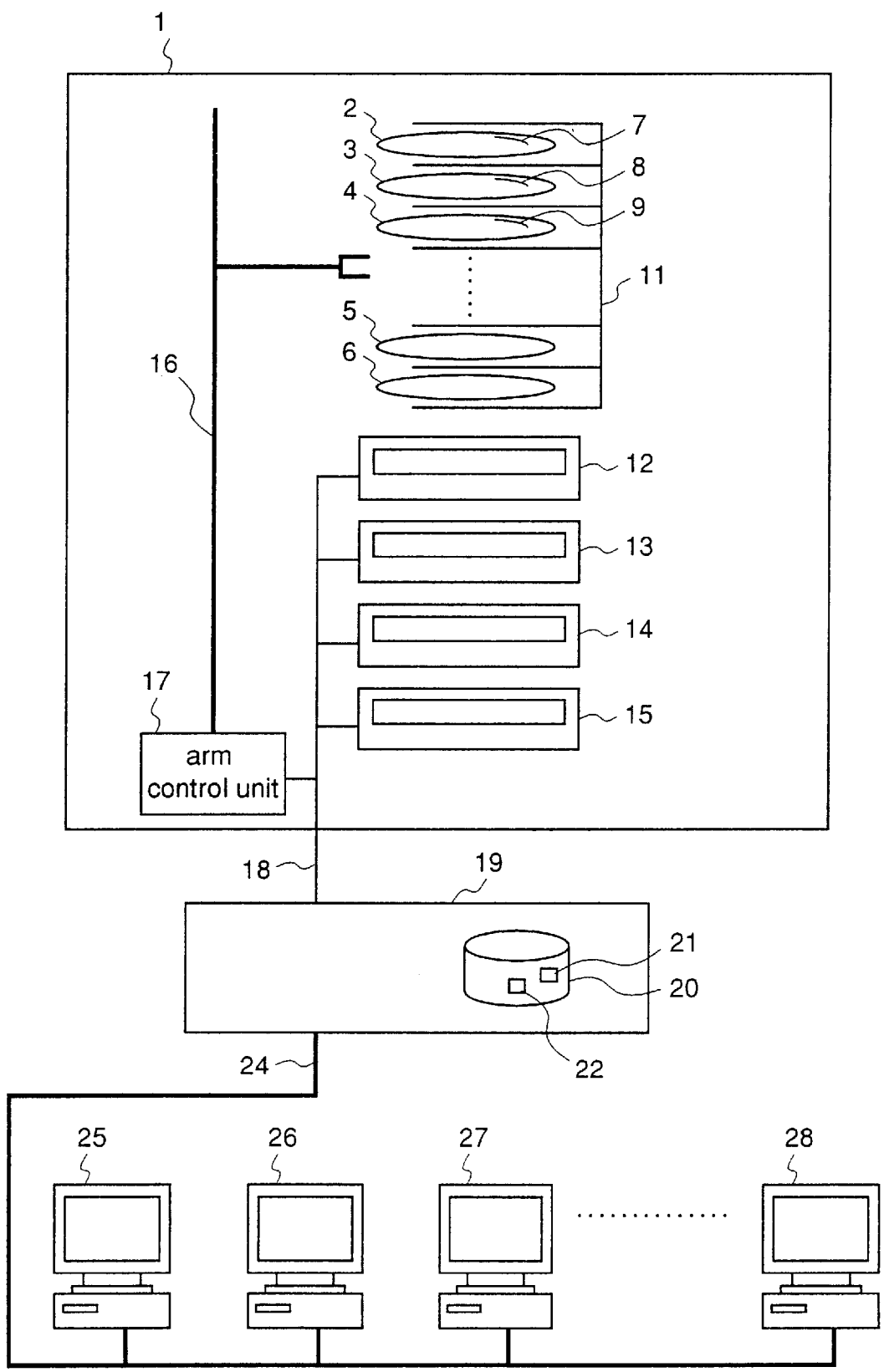
FIG. 1 is a diagram illustrating a network system in accordance with a first embodiment of the present invention.

FIG. 1 is a diagram illustrating d network system according to the first embodiment of the invention. In the figure, a library 1, disks 2 to 6, a disk storage unit 11, drives 12 to 15, an arm 16, an arm control unit 17, a bus 18, a server for library 19, a hard disk 20, a network 24 and terminal units 25 to 28 are identical as in the prior art. Therefore, concerning the disks 2 to 6 in the library 1, only one moving picture file can be played back from one disk at a time.

Reference numerals 7 to 9 designate files that are recorded on the disks in the library 1, which are files of moving picture data as in the prior art. Reference numerals 21 and 22 designate files for managing the library 1, and the server 19 records and updates the files 21 and 22. The file 21 comprises records of playback requests of the moving picture files from the terminal units, and the file 22 comprises file management information, i.e., records of the files that are recorded on the disks 2 to 6 and the presence of copies of the respective files on the other disks in the library 1 and the hard disk 20.

Figure 2:
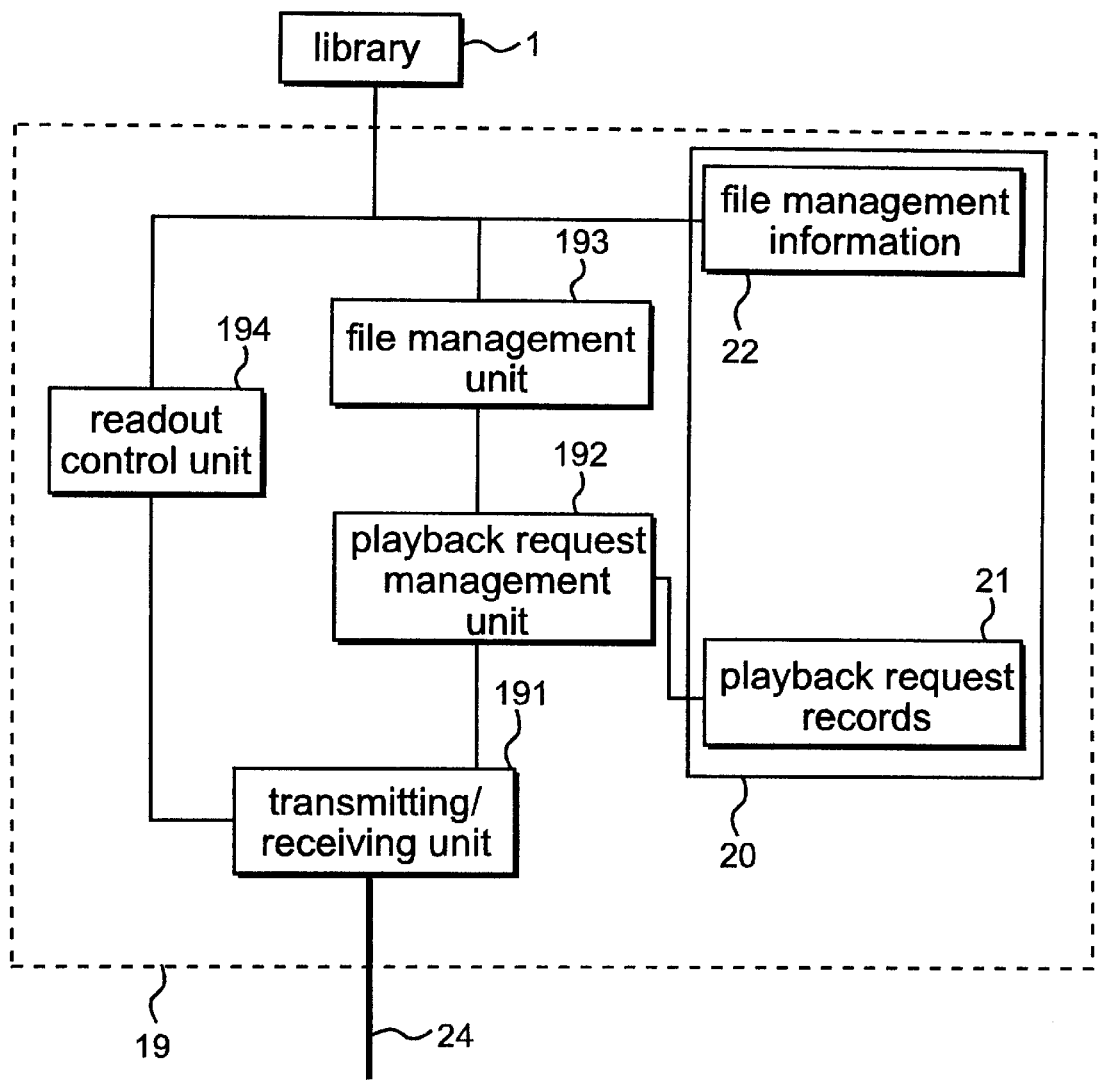
FIG. 2 is a block diagram illustrating a server for library according to the first embodiment of the invention.

FIG. 2 is a block diagram illustrating the server for library 19. Tn the figure, reference numeral 191 designates a transmitting/receiving unit for transmitting/receiving orders and data to/from the terminal units through the network 24. Reference numeral 192 designates a playback request management unit for recording the playback requests of the files from the terminal units on the hard disk 20, and creating frequency information of the playback requests of the respective files on the basis of the records. Reference numeral 193 designates a file management unit for managing and updating the file management information 22 that is recorded on the hard disk 20, and copying the moving picture files on the basis of the frequency information created in the request management unit 192. Reference numeral 194 designates a readout control unit for reading the moving picture files out of the library 1 and the hard disk 20 according to the playback requests.

FIG. 3 is a diagram illustrating the state of the playback request records 21 that are recorded on the hard disk 20. In the figure, reference numerals 29 to 50 designate records of playback requests and request times of the moving picture files 7 to 9 from the terminal units, and numerals 51 and 52 designate groups of playback requests that are obtained by separating the playback requests at a prescribed time.

FIG. 4 is a diagram illustrating the file management information 22 that is recorded on the hard disk 20. In the figure, reference numerals 53a and 53b designate the states of the file management information 22 of the disks 2 to 6 before and after creating copies, respectively, both of which comprise file names 54, disk names 55 including the respective files, information 56 about the presence of copies of the respective files in the hard disk 20, and disk names 57 including copies of the files.

Figure 5:
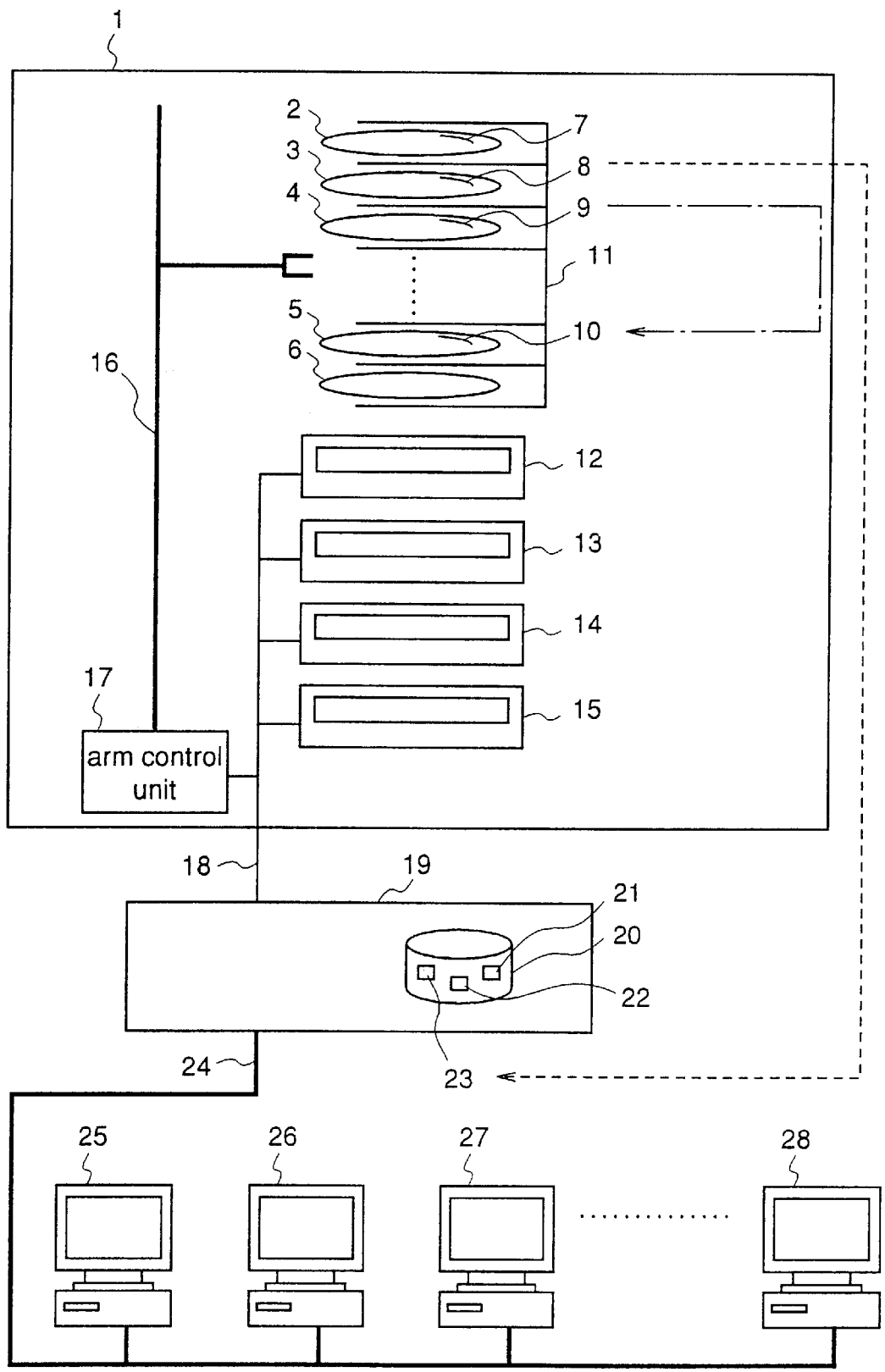
FIG. 5 is a diagram for explaining copy creation of files according to the first embodiment of the invention.

FIG. 5 is a diagram for explaining copy creation of files by the server of the first embodiment of the invention.

Figure 29:
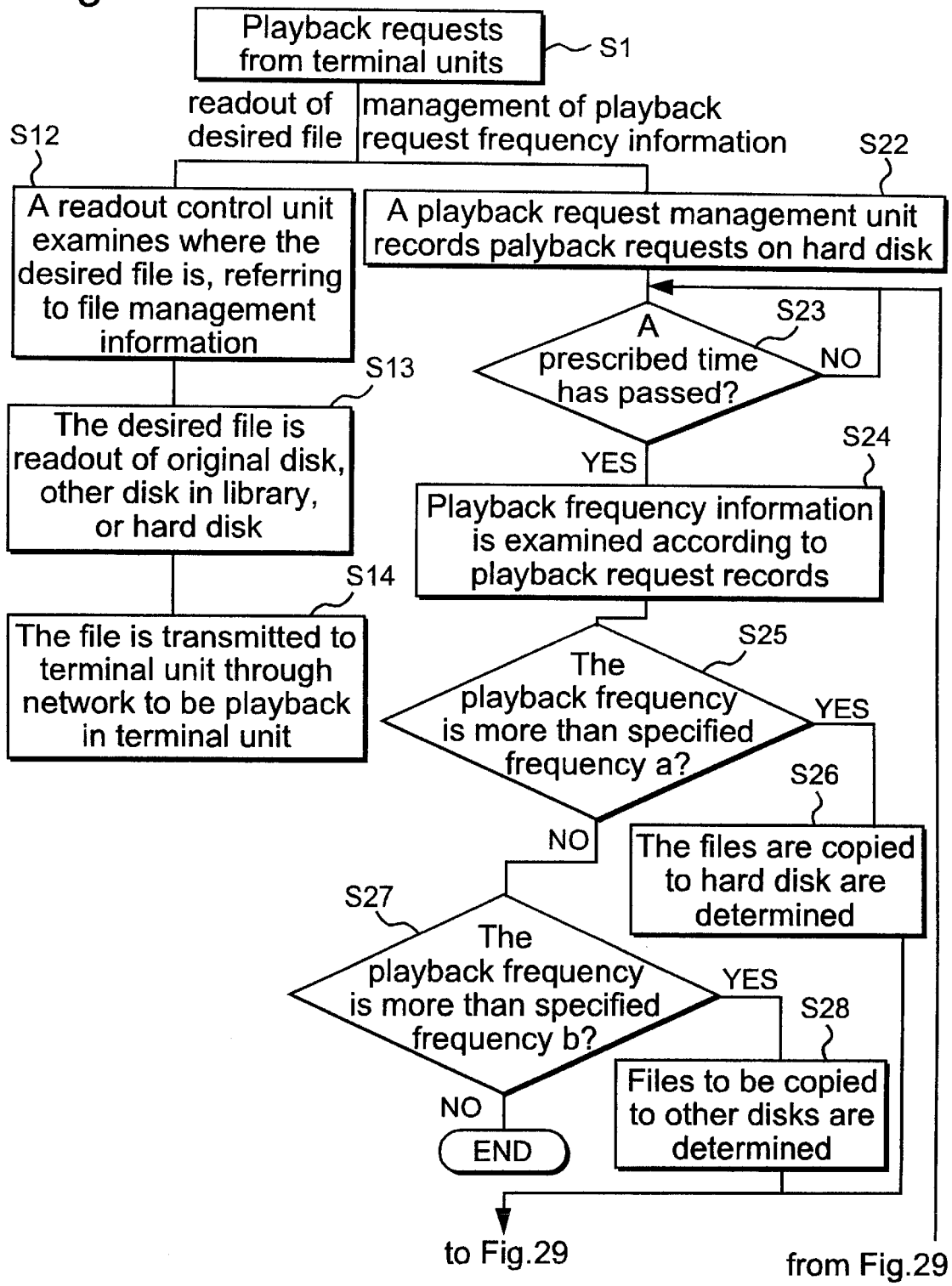
FIGS. 29 and 30 is a further flow chart for explaining the managing method and the operation of the server device according to the first embodiment of the invention.
Figure 30:
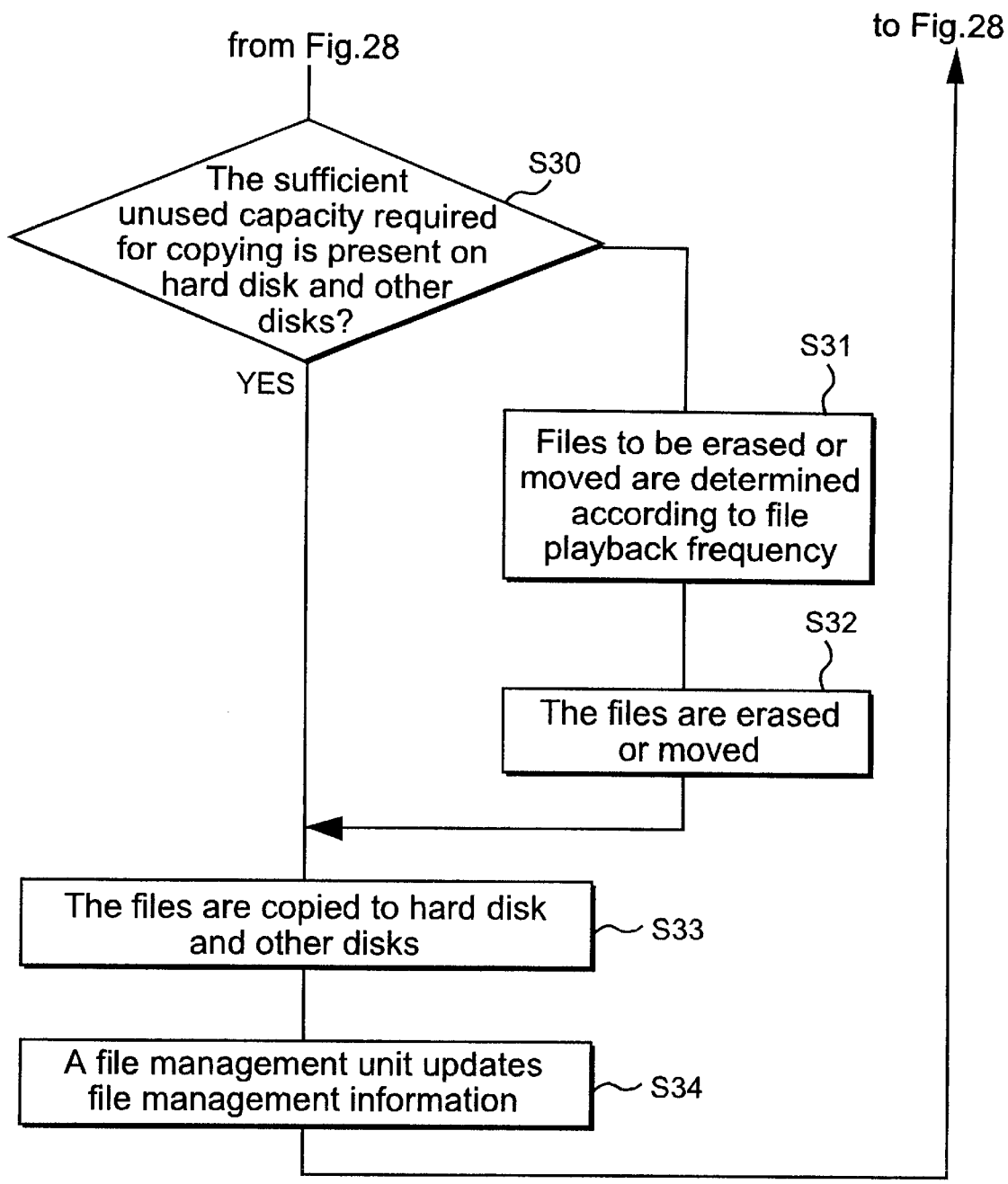

At first, a description is given of the general operation of the server for library according to the first embodiment with reference of FIGS. 28 and 29.

When a terminal unit makes a playback request of a file (step S1), in order to read out the desired file, a readout control unit examines where the desired file is, referring to file management information (step S12).

After the examination of the file in the step S12, the desired file is read out of the original disk, the other disk in the library, or a hard disk (step S13). In a step S14, the file is transmitted to the terminal unit through a network to play back moving picture data in the terminal unit.

Meanwhile, when the terminal unit makes the playback request in the step S1, simultaneously with the step S12, a step S22 is performed in order to manage playback request frequency information. In the step S22, a playback request management unit records the playback request on the hard disk.

When it is considered that a prescribed time has passed (step S23), playback frequency information is examined according to the information of the playback requests that have been recorded on the hard disk (step S24).

In a step S25, the playback frequency of each file is judged on the basis of specified playback frequency a. When the frequency of the file is more than the specified frequency a, it is determined to copy the file to the hard disk (step S26). When the playback frequency of the file is smaller than the specified frequency a in the step S25, the playback frequency is judged on the basis of specified playback frequency b (step S27). When the playback frequency is more than the specified frequency b, it is determined to copy the file to the other disk in the library (step S28). When the regeneration frequency is smaller than the specified frequency in the step S27, the file is not copied anywhere, thereby completing processing.

When the files to be copied are determined, it is examined whether the sufficient unused capacity required for copying these files is present on the hard disk and the other disks in the library or not (step S30). When the unused capacity is insufficient, on the basis of the regeneration frequency information, files to be erased or moved to the other disks are selected out of the files that have been recorded on the hard disk, and files to be erased are selected out of the copies of the files that have been recorded on the other disks (step S31). In a step S32, the files selected in the step S31 are erased or moved, thereby reserving required spaces on the hard disk and the other disks.

When the unused capacity required for copying is sufficient, or when the unused capacity has been reserved in the steps S31 and S32, the files are copied to the hard disk and the other disks (step S33).

In a step S34, after copying the files, a file management unit updates the file management information. Then, returning to the step S23 again, the file playback requests from the terminal units are processed.

A full detail is given of the operation of the server for library of the first embodiment, mainly when copies of the files in the library are created on the basis of playback request frequency form the terminals.

Initially, the files 7 to 9 of moving picture data are recorded on the disks 2 to 6 in the library 1, and in this state, the network system is operated. When any of the terminal units 25 to 28 makes a playback request of any of the moving picture files 7 to 9, the transmitting/receiving unit 191 in the server 19 receives this playback request to transmit the same to the playback request management unit 192 and the readout control unit 194. The playback request management unit 192 writes the file that has been requested and its request time to the playback request records 21 on the hard disk 20. The readout control unit 194 refers to the file management information 22 on the hard disk 20. The file management information 22 is in the state 53a shown in FIG. 4 and, using this information, the readout control unit 194 examines the disk including the file that has been requested from the terminal unit, and transmits control data required for data readout to the library 1. The operation when the desired disk is selected in the library 1 and the data of the disk is read out and transmitted is identical as in the prior art. The data that is read out of the disk in the library 1 is transmitted to the terminal unit through the readout control unit 194, the transmitting/receiving unit 191, and the network 24, to be regenerated.

When a prescribed time and over has passed, the playback request records 21 on the hard disk 20 become the state shown in FIG. 3. After the prescribed time, referring to the playback request records 21 of the files shown in FIG. 3, the playback request management unit 192 examines frequency of the playback requests 51 of the respective files in the prescribed time. At this time, it is found from the file playback requests 51 that the number of playback requests of the file 7 is two, the number of playback requests of the file 8 is twelve, and the number of playback requests of the file 9 is six.

The file management unit 193 creates copies of the files on the other disks and the hard disk 20 of further high speed, according to the frequency information of the playback requests in the prescribed time. In this case, the file management unit is set su that files of playback request frequency of ten or more are copied to the hard disk 20 of high speed, files of playback request frequency of five to nine are copied to the other disks in the library 1, and files of playback request frequency of four or less are not copied. Accordingly, as shown in FIG. 5, the file 8 that has been requested twelve times is copied to the hard disk 20 of high speed, the file 9 that has been requested six times is copied to the disk 5, and the file 7 that has been requested twice is not copied anywhere. In FIG. 5, it is shown that a copy 10 of the file 9 that is recorded on the disk 4 is created on the disk 5, and a copy 23 of the file 8 that is recorded on the disk 3 is created on the hard disk 20.

After copying the files, the file management unit 193 updates the contents of the file management information 22 shown in FIG. 4. That is, the state 53a of the file management information 22 is changed to the state 53b. Since the file 7 is not copied, the information 56 about the presence of a copy of the file on the hard disk and the disk name 57 including a copy of the file are unchanged. Since the file 8 is copied to the hard disk 20, the information 56 about the presence of a copy is changed from "no copy" to "copied". Since the file 9 is copied to the disk 5, the disk name 57 including a copy is changed from "no copy" to "disk 5".

After this, when a playback request of the file 8 is transmitted from any of the terminal units and the readout control unit 194 refers to the file management information 53b shown in FIG. 4, it is found that the file 8 is recorded on the hard disk 20. Therefore, the readout control unit 194 reads out and transmits the copy 23 of the file 8 on the hard disk 20 to playback the same. As described above, the copy 23 is a file on the hard disk 20 that can perform high-speed access, so that it is possible to transmit the copy 23 simultaneously to the plurality of terminal units.

When a playback request of the file 7 or file 9 is transmitted from any of the terminal units, the readout control unit 194 refers to the file management information 53b shown in FIG. 4, and examines the disk including the requested file and, thereafter, the data of the disk is read out. Since the file 7 is recorded only on the disk 2, the file can be transmitted only to one terminal unit. Meanwhile, since the file 9 is copied to the disk 5, the file 9 on the disk 4 and the copy 10 on the disk 5 are played back, so that the data of the file 9 can be transmitted simultaneously to two terminal units.

Further, by the playback request management unit 192, playback requests from the terminal units are successively written to the playback request records 21 on the hard disk 20. After the prescribed time, when the playback requests 52 of the files in the prescribed time are recorded again as shown in FIG. 3, the file management unit 193 copies the moving picture files of high frequency in playback request to the hard disk 20 and the other disks in the library 1, and updates the file management information 22. The playback request management unit 192 successively erases old parts of the playback request records 21 after the prescribed time.

In the server for library according to the first embodiment, the following operation is possible by setting the file management unit 193.

When the playback request frequency of the file that has been copied only to the other disk in the library 1 becomes further high, a copy of the tile is also created on the hard disk 20, leading to an increase in the simultaneous transmission number to the terminal units. In addition, when the unused capacity of the hard disk 20 becomes small and no file can be copied to the hard disk 20 any more, among the files that have been copied to the hard disk 20, the file of low playback request frequency is copied to the other disk, and the copy of the file on the hard disk 20 is erased. Alternatively, the copy of the file of further low playback request frequency is erased from the hard disk 20 without creating a copy of the file on the other disk.

Similarly, when the unused capacity of the disks in the library 1 becomes small and no file can be copied to the disks any more, among the copies of the files on the disks, the copy of the file that has been retained in both of the other disk and the hard disk 20 or the copy of the file of low playback request frequency is erased to reserve a required space, and a copy of another file is created thereon.

In the first embodiment of the invention, the number of copies of a file that are created on other disks is one. However, since there are four drives in the library as shown in FIG. 1, the number of disks to which the file is copied may be chosen out of one, two and three according to the playback request number.

Further, it is possible to determine on copying files according to the order of the playback request number. That is, some files that are selected in the descending order of the playback request number from the file of the largest request number are copied to the hard disk. Some files that are further selected in the descending order of the playback request number, except the files that are copied to file hard disk, are copied to the other disks, respectively. The other files of small playback request number are not copied anywhere.

As described above, in the server for library according to the first embodiment of the invention, the playback request management unit 192 records playback requests of files from the terminal units, and creates frequency information of the playback requests of the respective file on the basis of the records. The file management unit 193 copies the files that are recorded on the disks in the library 1 to the other disks and the hard disk 20, respectively, on the basis of the frequency information. The files on the disks in the library 1 and the hard disk 20 are managed by the file management information 22 that has been updated by the file management unit 193. Referring to the file management information 22, the readout control unit 194 reads out data of files corresponding to playback requests from the terminal units. In this way, all of the files of high playback request frequency are copied to the hard disk as in the prior art, and further, some files are copied to the other disks in the library, respectively. Therefore, as long as the drives in the library can be used, the files are also transmitted from the disks, whereby it is possible to transmit more files simultaneously to the terminal units than when the copies of the files are created only to the hard disk as in the prior art.

Embodiment 2

In a server for library according to a second embodiment of the present invention, files that are recorded on disks in a library are copied to other disks in the library and a hard disk according to playback request frequency from terminal units, respectively.

The server for library of the second embodiment of the invention has the same construction as in the first embodiment, and FIGS. 1, 2 and 5 are used for explanation. The file management information 22 is identical as in the first embodiment shown in FIG. 4.

Figure 6:
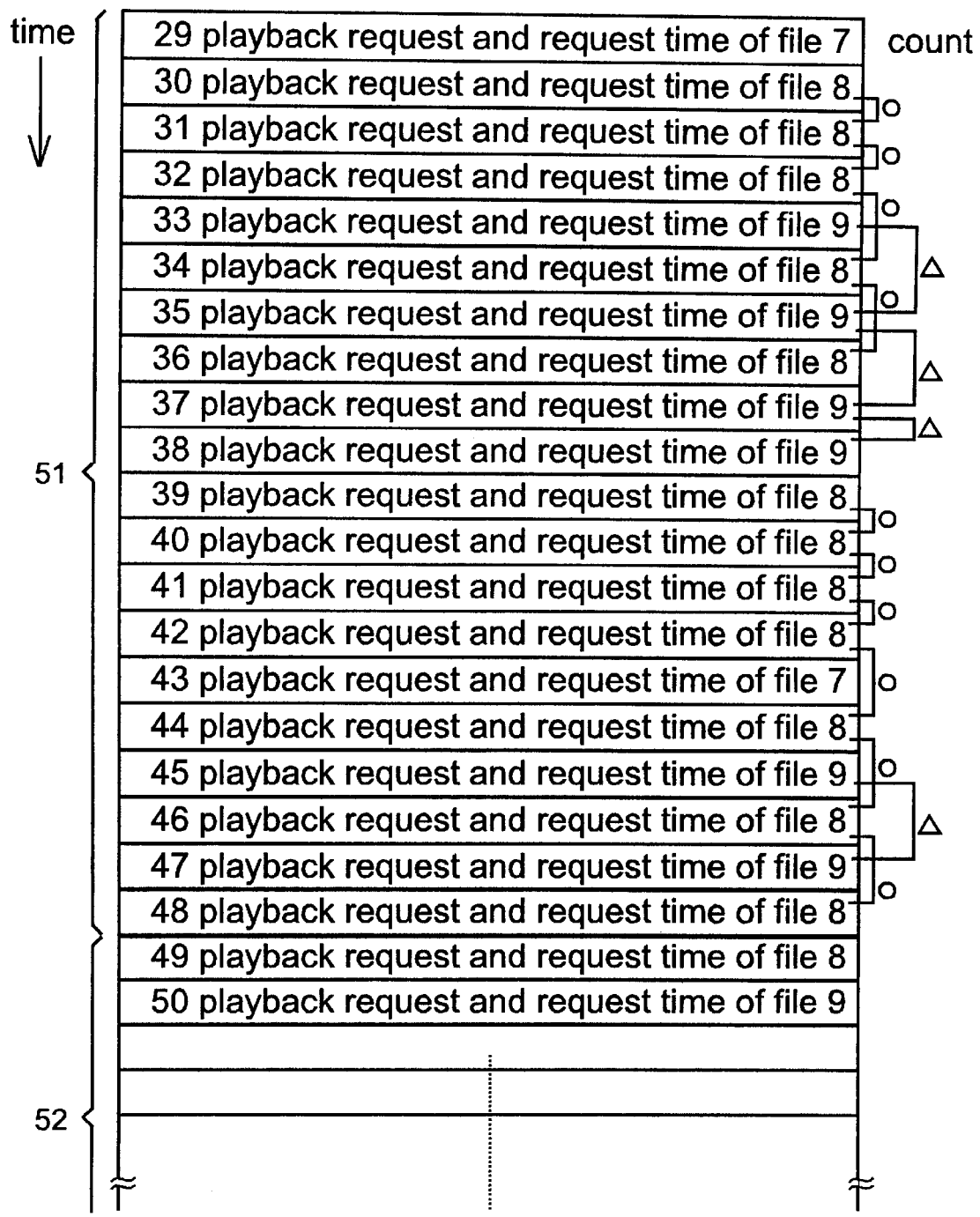
FIG. 6 is a diagram illustrating records of file playback requests from terminal units in accordance with a second embodiment of the present invention.

In the server 19 of the second embodiment, as in the first embodiment, the playback request management unit 192 records playback requests from the terminal units as the playback request records 21 on the hard disk 20. The records are as shown in FIG. 6. After a prescribed time, the playback request management unit 192 creates frequency information of the playback requests. In the second embodiment, however, without being based on the playback request number as in the first embodiment, the intervals between the request times of each file are calculated on the basis of the request times of the playback request records 21.

The playback request management unit 192 performs calculations as follows. Among the intervals between the request times of each file of the playback requests 51 in the prescribed time shown in FIG. 6, the tile intervals shorter than a specified time are counted. For simplification, it is supposed that all the playback requests shown in FIG. 6 are performed at even intervals in time, and only the time intervals between adjacent requests of each file and the time intervals between requests sandwiching a request of another file are counted. For example, although the time intervals between the playback requests 30 and 3L, and 33 and 35 are counted, the interval between the requests 36 and 39 is not counted.

Figure 7:
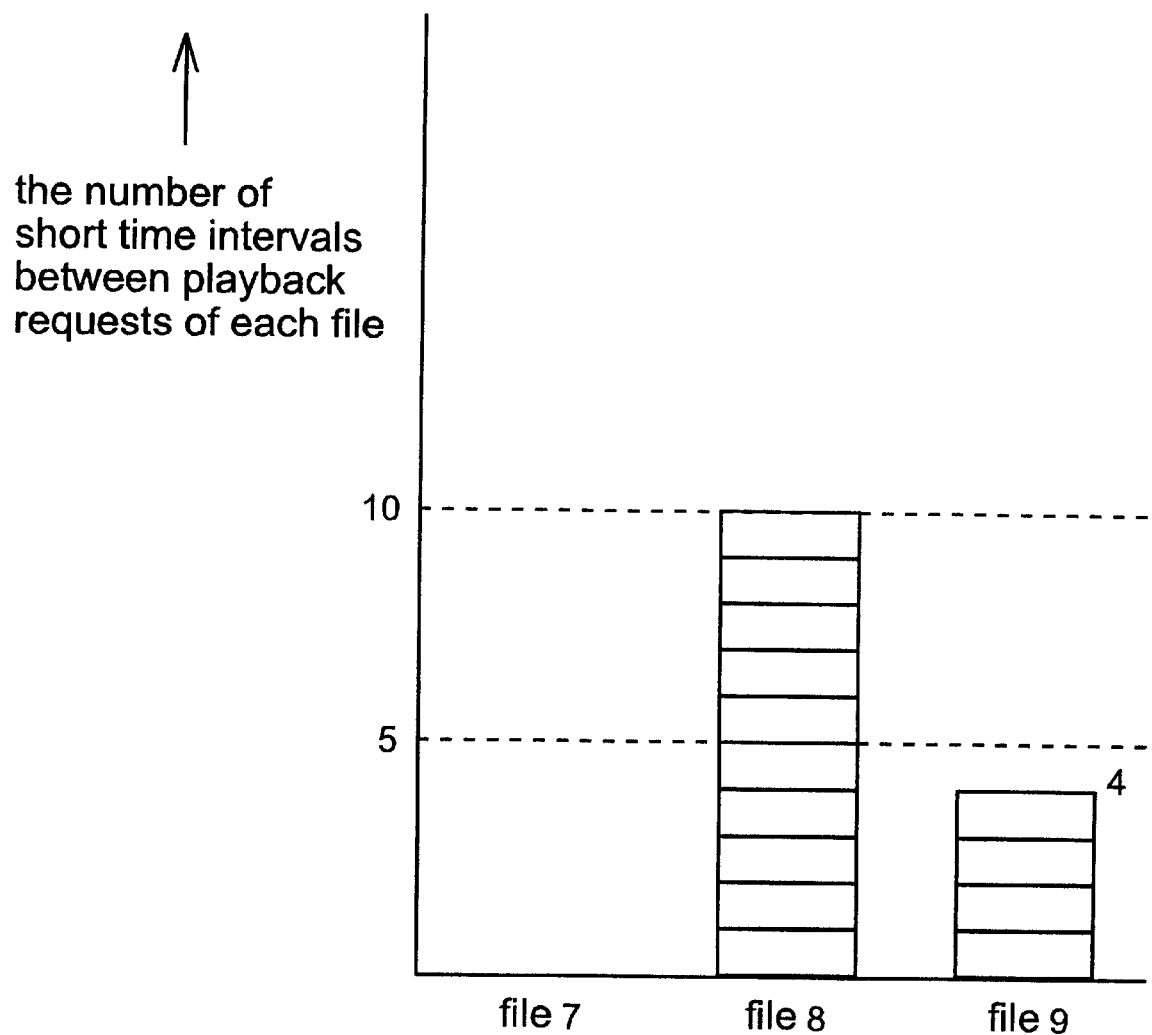
FIG. 7 is a graph for explaining creation of frequency information on the basis of the playback request records according to the second embodiment of the invention.

In the playback requests 51 in the prescribed time, the requests of the file 7 are not applicable to the condition described above, and the counting result is 0. The time intervals of the requests of the file 8 and the file 9, which are respectively shown by ⊖ and Δ in FIG. 6, are counted, resulting in a graph shown in FIG. 7.

In the second embodiment of the invention, the file management unit 193 is set so that when the number of time intervals shorter than a specified time between playback requests of a file is eight or more, the file is copied to the hard disk 20, and when it is not less than four and not more than seven, the file is copied to the other disk in the library 1. According to this setting, the file management unit 193 creates a copy of the file 8 on the hard disk 20 and creates a copy of the file 9 on the disk 5. After the copy creation, as in the first. embodiment, the file management information 22 shown in FIG. 4 is updated.

In the server according to the second embodiment, it is possible to change the setting about the playback request management unit 192 and the file management unit 193, obtain time intervals as described below, and create copies according to the time intervals. Initially, the playback request management unit 192 collects the playback requests of each fill shown in FIG. 6. When the number of playback requests of each file reaches a specified value, the time intervals of the playback requests of the specified value are calculated from the request times of the first request and the final request of each file. The file management unit 193 treats the time intervals that are obtained by the playback request management unit 192 like the frequency information described for the first embodiment. That is, the file management unit copies the files of the time intervals shorter than a specified time to the hard disk 20, copies the files of the middle time intervals to the other disks in the library 1, respectively, and does not copy the files of the longer time intervals.

As described above, in the server for library according to the second embodiment of the invention, the playback request management unit 192 calculates time intervals between playback requests of each file, and the file management unit 193 copies the files that have been frequently requested at the short time intervals to the other disks in the library 1 and the hard disk 20, respectively. From the fact that files are frequently requested at short time intervals, it is considered that the files often receive the simultaneous playback requests from the plurality of terminal units. Consequently, in the second embodiment of the invention, it is possible to increase the number of files that accept many of the requests from the plurality of terminal units and are simultaneously transmitted.

In the first and second embodiments ot the invention, the frequency information is created on the basis of the records of the playback requests, by separating the requests at prescribed times. However, the frequency information may be created every time the playback requests reach a prescribed number, by separating the playback requests according to the request number.

Further, in the first and second embodiments, the playback request management unit creates frequency information at prescribed times, and the file management unit creates copies on the basis of the frequency information However, for example, it is possible that the playback request management unit records playback requests, and at the same time, creates and updates frequency information of the requests of each file, and the file management unit creates copies at prescribed times, referring to the frequency information.

Embodiment 3

In a server for library according to a third embodiment of the present invention, it is possible to copy filers in a library according to instructions by the operator.

Figure 8:
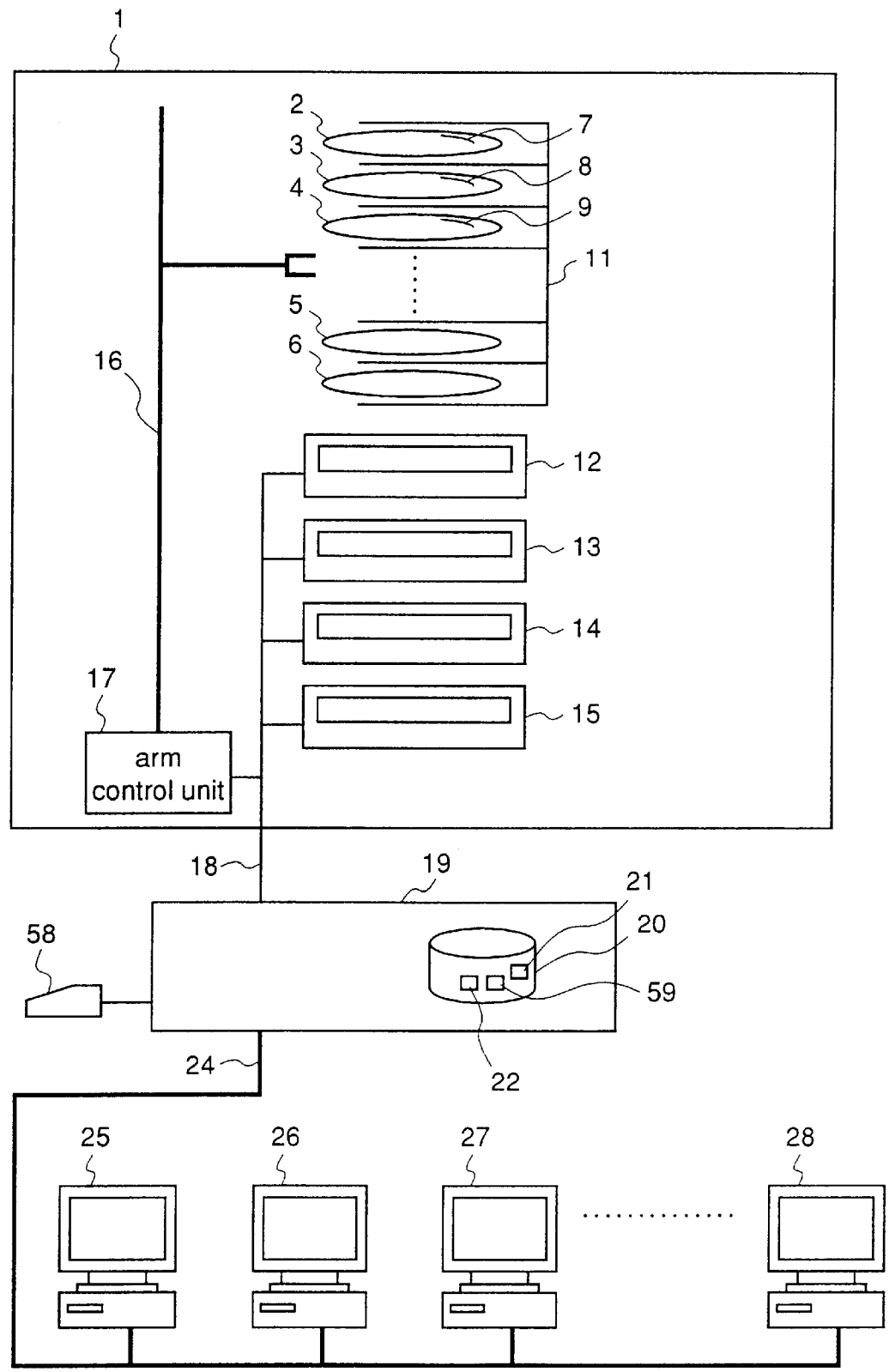
FIG. 8 is a diagram illustrating a network system in accordance with third and fourth embodiments of the present invention.

FIG. 8 is a diagram illustrating a network system according to the third embodiment of the invention. In the figure, reference numeral 58 designates an input device for inputting set information of file copies by the operator, such as a keyboard, and numeral 59 designates file copy set information that is recorded on the hard disk 20. The same reference numerals as those shown in FIG. 1 are identical as in the first embodiment.

Figure 9:
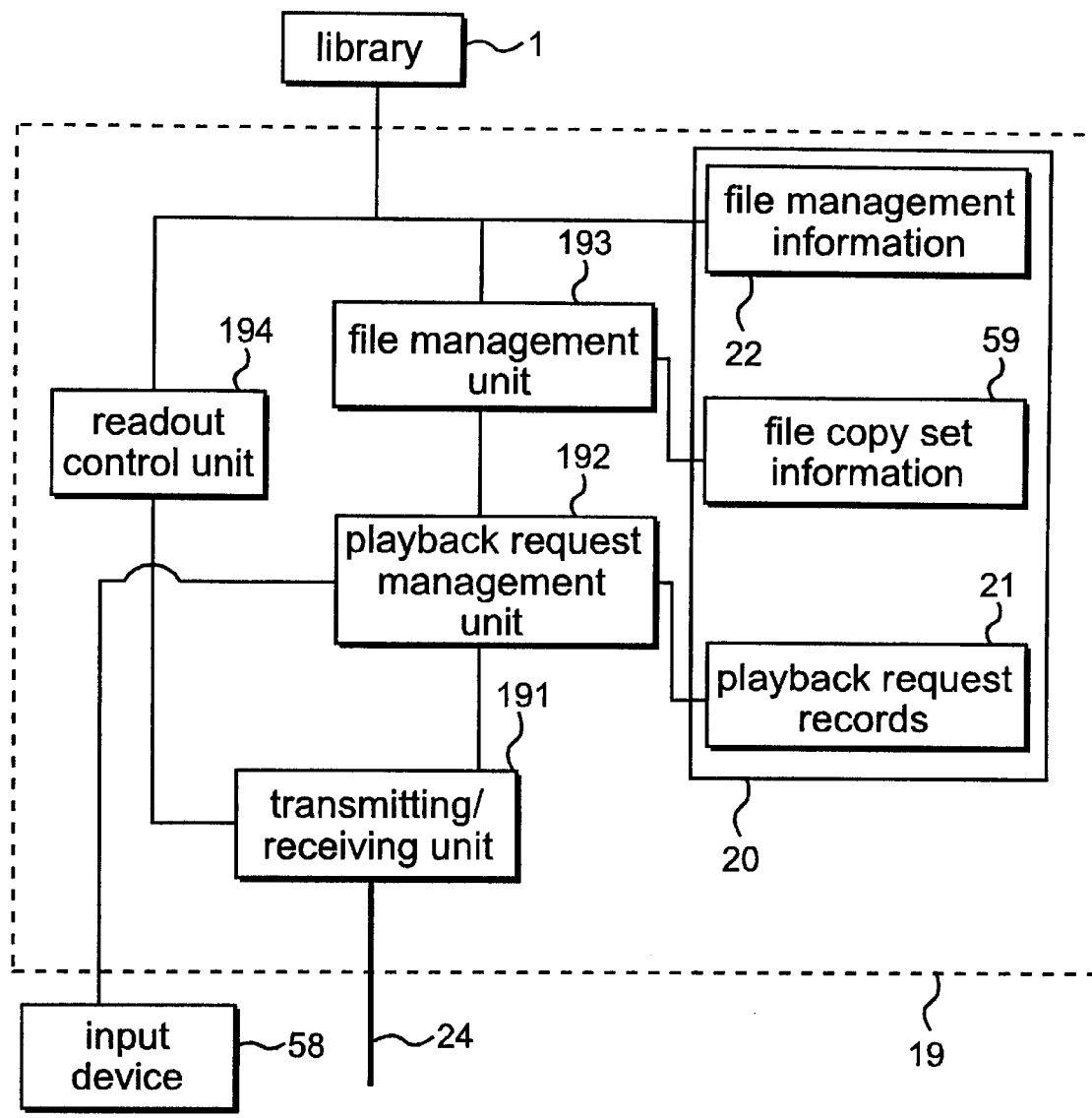
FIG. 9 is a block diagram illustrating a server for library according to the third and fourth embodiment of the invention.

FIG. 9 is a block diagram illustrating the server for library 19. In the figure, the same reference numerals as those shown in FIG. 2 are identical as in the first embodiment, except the input device 58 and the file copy set information 59 shown in FIG. 8. In addition, in the sever 19 of the third embodiment, the playback request management unit 192 and the file management unit 193 receive inputs from the input device 58.

FIG. 10 is a diagram illustrating the file copy set information 59 that is recorded on the hard disk 20. In the figure, reference numerals 60a and 60b designate the states of the file copy set information 59 before and after creating copies, respectively, both of which comprise file names 61, information 62 about disks to which the files art copied, and information 63 whether copies of the files have been created or not. The file management information 22 is identical as in the first embodiment shown in FIG. 4.

In the server for library according to the third embodiment, the operations of reading out and transmitting files corresponding to playback requests from the terminal units and creating copies of the files on the basis of frequency of the playback requests are identical as in the first embodiment. Further, in the third embodiment of the invention, the copies of the files can be created according to instructions by the operator. The following description will be given of the operation in this case.

The contents of the file 8 and file 9 have been updated, so that it is predicted that the playback requests of these files from the terminal units increase. The operator of the server 19 inputs file names to be copied and places to which the files are copied, ELom the input device 59 shown in FIGS. 8 and 9. The places where the files are copied are respectively selected out of the hard disk 20 that can transmit data of a file simultaneously to a plurality of terminal units, and the other disks in the library 1 that enable file transmission simultaneous to two terminal units. In this case, the operator predicts that the file 8 will receive the most playback requests and the file 9 will receive not so many playback requests, and sets these files so that the file 8 is copied to the hard disk 20 and the file 9 is copied to the other disk in the library 1.

Figure 11:
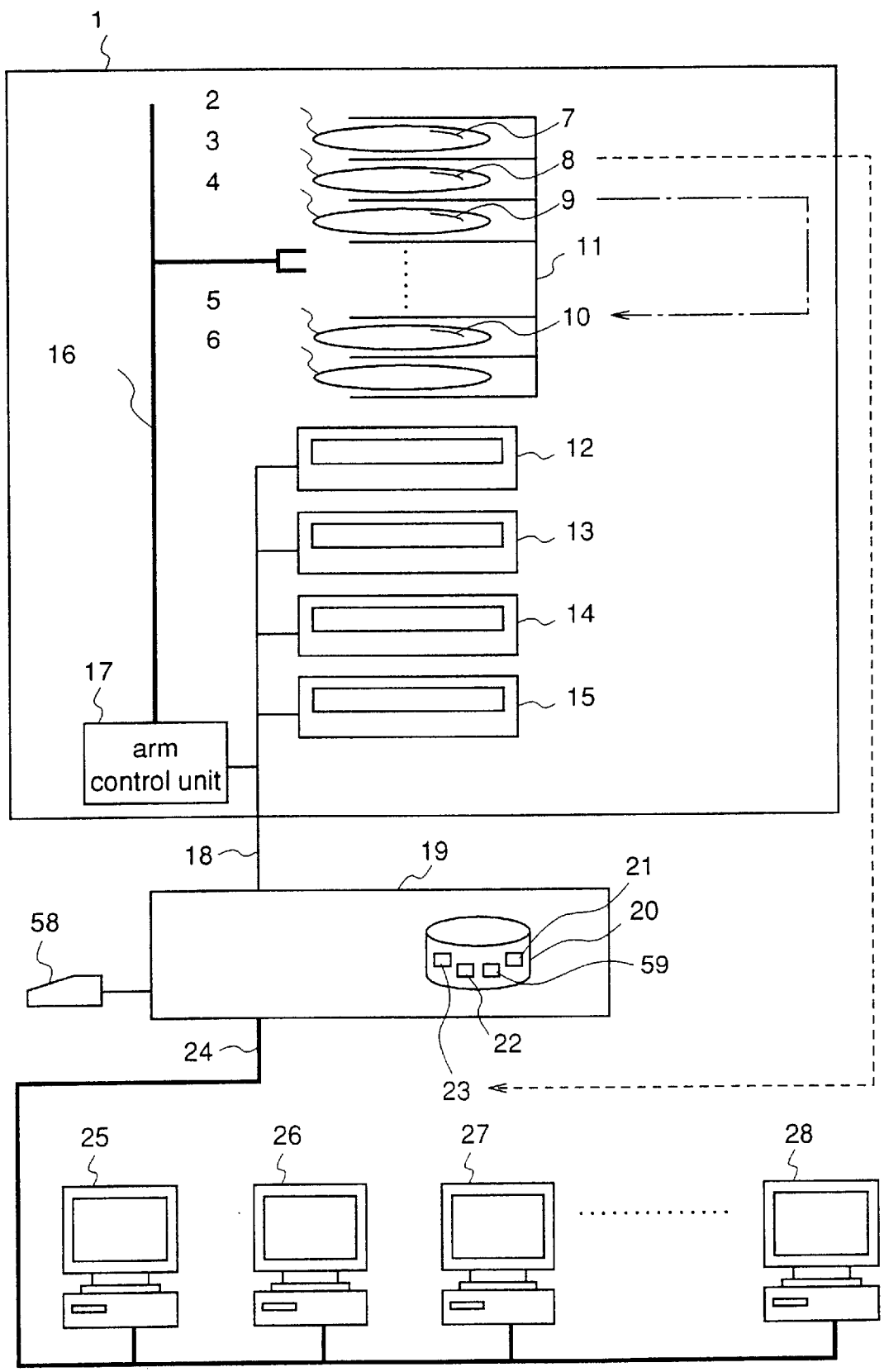
FIG. 11 is a diagram for explaining copy creation of files according to the third embodiment of the invention.

The file management unit 193 receives the inputs from the input device 58, and writes the file copy set information 59 on the hard disk 20, as the state 60a shown in FIG. 10. Thereafter, as shown in FIG. 11, the file management unit 193 copies the file 8 to the hard disk 20 and copies the file 9 to the disk 5, and then, the file copy set information 59 is changed from the state 60a to the state 60b shown in FIG. 10. That is, the information 63 about the presence of file copies is changed from "no copy" to "copied".

Then, as in the first embodiment, the file management unit 193 updates the file management information 22 that is recorded on the hard disk 20, from the state 53a to the state 53b. That is, as shown in FIG. 4, concerning the file 8, the information 56 about the presence of a copy is changed from "no copy" to "copied". Concerning the file 9, the disk name 57 including a copy is changed from "no copy" to "disk 5".

As described above, the server for library according to the third embodiment of the invention is provided with the input device 58, and the file management unit 193 receives instructions about file copy creation by the operator, records these instructions as copy set information, and creates file copies according to the instructions. In this way, the operator directly sets the place where each file is copied, i.e., the hard disk 20 or the other disk in the library 1, in the server. Therefore, when an increase or reduction in requests is predicted, it is possible to accept the requests earlier and operate the server with better efficiency than when the files that receive many playback requests are copied after a prescribed time on the basis of the records of the requests of the files, as in the first and second embodiments.

Embodiment 4

In a server for library according to a fourth embodiment of the present invention, it is possible to copy files in a library according to instructions by the operator.

The server for library of the fourth embodiment of the invention has the same construction as in the third embodiment, and FIGS. 8 and 9 are used for explanation.

The server of the fourth embodiment operates almost as the server of the third embodiment. In the third embodiment, the operator performs inputs from the input device 58 to the file management unit 193, thereby setting the file copy set information 59. Meanwhile, in the fourth embodiment, the operator inputs frequency of playback requests of files to be predicted from the input device 58 to the playback request management unit 192. As soon as the inputs by the operator are performed, the playback request management unit 192 outputs the inputs as frequency information to the file management unit 193, and the file management unit 193 copies the files according to the frequency information.

The server for library according to the fourth embodiment of the invention is provided with the input device 58, and the operator can input playback request frequency from the input device 58 to the playback request management unit 192 and set frequency information on the basis of the records of the regeneration requests. Therefore, when an increase or reduction in requests is predicted, it is possible to accept the requests earlier and operate the server with better efficiency as in the third embodiment.

When the operator performs inputs, the records of the playback requests of the files and the frequency information of the requests, which have been recorded and created in the past, may be examined by the server.

In any of the third and fourth embodiments of the invention, a description is given of the case where files are copied to the hard disk and the other disks in the library, respectively. However, when the operator predicts that files that have now received many playback requests will receive few requests in the future, the information 62 about disks where the files are copied, shown in FIG. 10, is set to "no copy" in the third embodiment, or the contents of the playback request records 21 shown in FIG. 8 are erased in the fourth embodiment, whereby the server can erase the copies of the files that are recorded on the hard disk and the other disks in the library.

Further, in any of the third and fourth embodiments of the invention, files are copied as soon as the operator completes setting file copies or setting frequency ot file playback requests. However, the timing for copying files may be identical as in the case of the copy creation on the basis of the file playback request frequency in a prescribed time.

Furthermore, in any of the third and fourth embodiments of the invention, although file copies or frequency of file playback requests is set from the input device that is connected to the server, the setting can be performed from the terminal units.

Embodiment 5

In a server for library according to a fifth embodiment of the present invention, files that are recorded on disks in a library are copied according to playback request frequency in a long term and in a short term.

The server for library of the fifth embodiment of the invention has the same construction as in the first embodiment, and FIGS. 1, 2, 4 and 5 are used for explanation.

FIG. 12 is a diagram illustrating the regeneration request records 21 that are recorded on the hard disk 20. In the figure, reference numerals 64 to 96 designate records of playback requests and request times of the files 7 to 9 from the terminal units, and numerals 97 and 98 designate groups of playback requests that are obtained by separating the playback requests at a long term and at a recent short term, respectively. In addition, the long term in this case corresponds to a prescribed time that is described for the first embodiment.

In the server of the fifth embodiment, the operation of reading out and transmitting files corresponding to playback requests from the terminal units is identical as in the first embodiment. The following description will be given of the operation when files are copied on the basis of playback request records.

As in the server of the first embodiment, after a prescribed time, the playback request management unit 192 examines the playback requests 97 of the respective files 7 to 9 in the long term, shown in FIG. 12 and obtains frequency information that the number of playback requests of the file 7 is four, the number of playback requests of the file 8 is ten, and the number of playback requests of the file 9 is nineteen.

In this case, the file management unit 193 is set so that files of playback request frequency of twenty-five or more in a long term are copied to the hard disk 20, files of playback request frequency of fifteen to twenty-four are copied to the other disks in the library 1, and files of playback request frequency of fourteen or less are not copied. Accordingly, the file management unit 193 copies the file 9 that has been requested nineteen times to the other disk, and does not copy the other two files anywhere.

In FIG. 12, the file playback requests have a time series, and the playback requests that are described below in the figure are newer. From the figure, it is found that the recent playback request number of the file 8 is exceedingly increasing.

When examining the recent playback requests 98 of the respective files, the request number of the file 7 is zero, the request number of the file 8 is eight, and the request number of the file 9 is two. Since the playback request number of the file 8 in the long term is not so large, the file 8 has not been copied. However, the recent playback request number of the file 8 is exceedingly increasing. Therefore, if the file 8 is copied, many playback requests from the terminal units can be accepted. Consequently, the server of the fifth embodiment is also set to refer to the recent file playback requests 98.

In the fifth embodiment of the invention, the playback request management unit 192 obtains, sequentially to the frequency information in the long term, frequency information from the recent playback requests 98 of the respective files. The results are as above, and these results are transmitted to the file management unit 193. In this case, the file management unit 193 is set so that files of recent request number of eight or more are copied to the hard disk 20, files of recent request number of five to seven are copied to the other disks in the library 1, and files of recent request number of four or less are not copied. Accordingly, the file 8 is copied to the hard disk 20.

As a result, as shown in FIG. 5, the file 9 that has received many playback requests in the long term is copied to the disk 5, and the file 8 that has recently received many requests is copied to the hard disk 20.

After copying these files, the file management unit 193 updates the contents of the file management information 22 on the hard disk 20. That is, the state 53a shown in FIG. 4 is changed to the state 53b. Concerning the file 8, the information 56 about the presence of a copy is changed from "no copy" to "copied", and concerning the file 9, the disk name 57 including a copy is changed from "no copy" to "disk 5".

FIG. 13 is a diagram illustrating an application of the server for library according to the fifth embodiment. The operation of recording the file playback requests in the long term is the same as described above. However, in creating the frequency information in the playback request management unit 192, the number of the recent playback requests that are described below in FIG. 13 is doubled to be counted. When the recent file playback request number is weighted, the files that have recently received many requests are probable to be copied, whereby it is possible to accept the requests from the terminal units earlier.

As described above, in the server for library according to the fifth embodiment of the invention, the playback request management unit 192 creates frequency information in a long term and in a short term, on the basis of playback request records of files, and the file management unit 193 copies the files on the basis of the frequency information in both terms. In this way, the files that are respectively copied to the hard disk 20 and file other disks in the library 1 are determined according to both of the file request number in the long term and the recent file request number. Consequently, it is possible to accept various requests from the plurality of terminal units and simultaneously transmit many files. Further, when any of requests in a long term and recent requests is weighted, the requests can be accepted more flexibly by setting the frequency information in the playback request management unit 192.

Embodiment 6

In a server for library according to a sixth embodiment of the present invention, it is possible to copy files in a library according to frequency of simultaneous playback requests from a plurality of terminal units.

Figure 14:
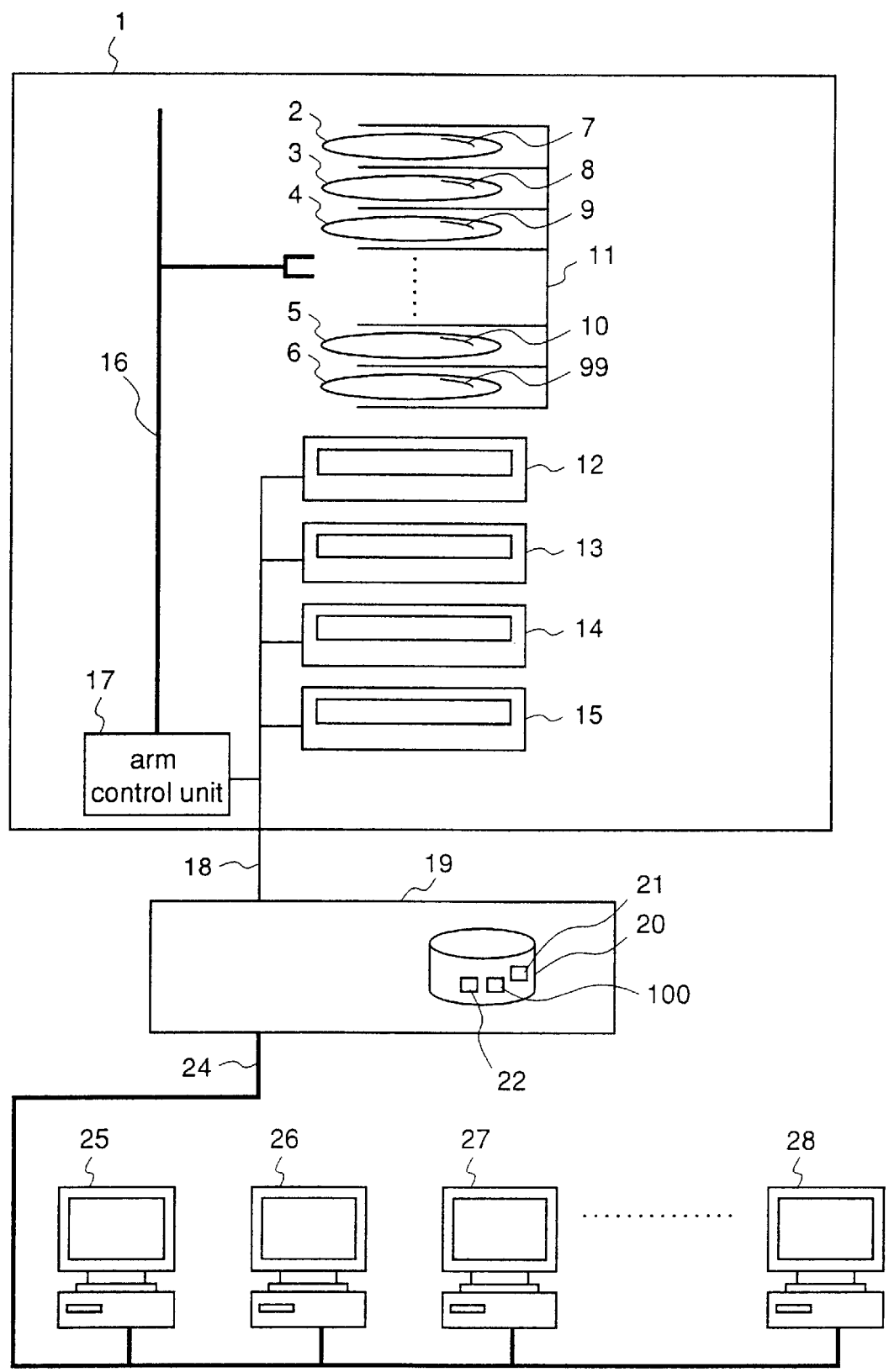
FIG. 14 is a diagram illustrating a network system in accordance with a sixth embodiment of the present invention.

FIG. 14 is a diagram illustrating a network system according to the sixth embodiment of the invention. In the figure, reference numeral 100 designates simultaneous playback request records of files and copies of the files, which are recorded on the hard disk 20. The same reference numerals as those shown in FIG. 1 are identical as in the first embodiment.

Figure 15:
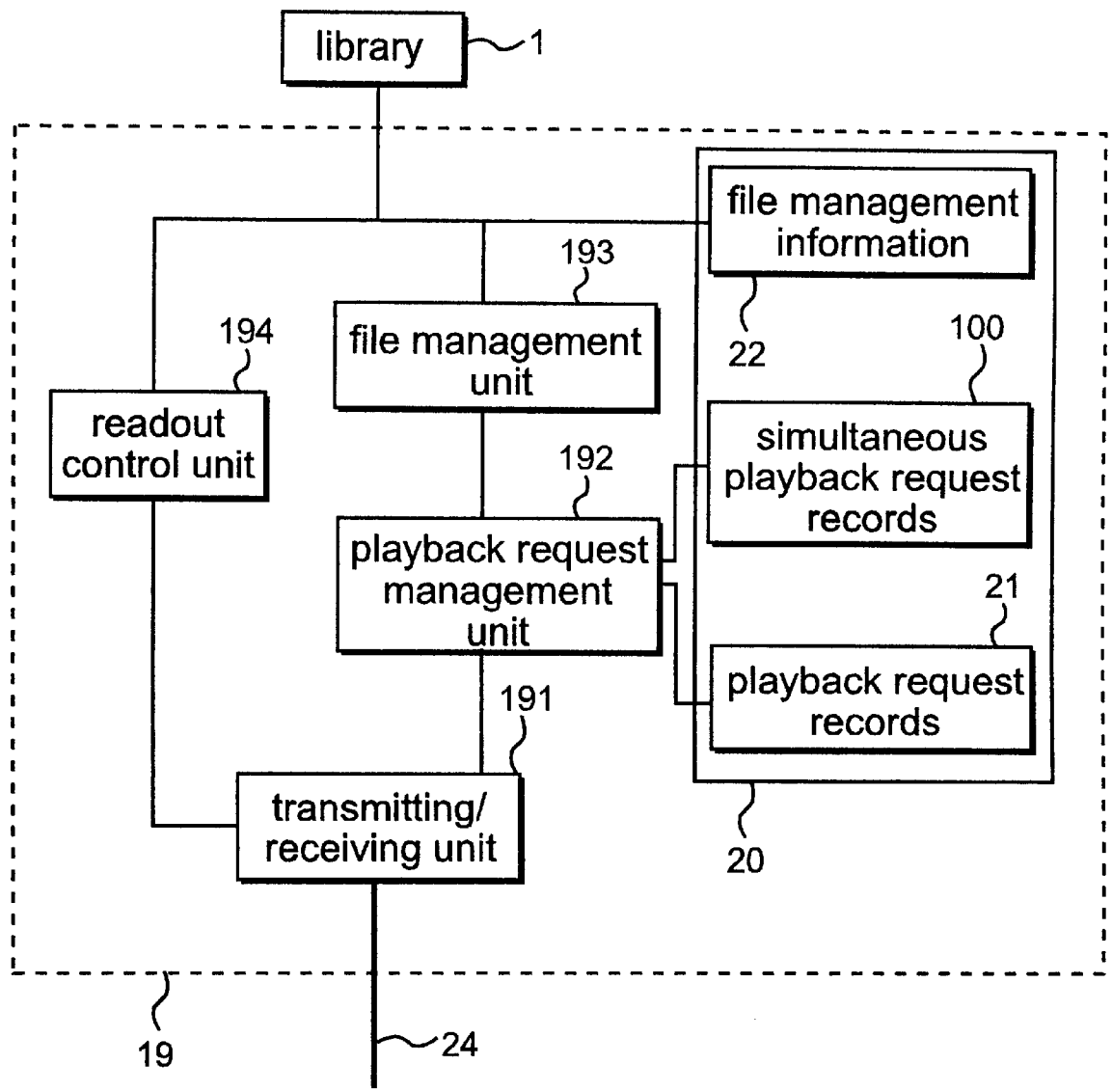
FIG. 15 is a block diagram illustrating a server for library according to the sixth embodiment of the invention.

FIG. 15 is a block diagram illustrating the server for library 19. In the figure, the same reference numerals as those shown in FIG. 2 are identical as in the first embodiment, except the simultaneous playback request records 100 shown in FIG. 14. In addition, in the sixth embodiment, when files and copies of the files receive simultaneous playback requests from the plurality of terminal units, the playback request management unit 192 records these requests as the simultaneous playback request records 100.

In the server of the sixth embodiment, the operation of reading out and transmitting files corresponding to playback requests from the terminal units is identical as in the first embodiment. The following description will be given of the operation of recording simultaneous playback requests of files and creating copies ot the files on the basis of the simultaneous playback request records.

In this case, as shown in FIG. 14, the file 8 that is recorded on the disk 3 in the library 1 has been copied to the disk 6 as a copy 99, and the file 9 that is recorded on the disk 4 has been copied to the disk 5 as a copy 10.

As in the first embodiment of the invention, the playback requests from the terminal units are recorded on the hard disk 20 as the playback request records 21 of the files. Further, in the sixth embodiment, the playback request management unit 192 records the simultaneous playback request records 100 of the files and their copies on the hard disk 20.

More specifically, for example, when the file 8 receives a playback request from the terminal unit 26 while the file 8 on the disk 3 is played back according to a playback request from the terminal unit 25, the readout control unit 194 reads the copy 99 of the file 8 out of the disk 6 to regenerate the same, referring to the file management information 22. At this time, because the playback request of the file 8 during playback becomes a simultaneous playback request, the playback request management unit 192 records this playback request in the playback request records 21 and the simultaneous playback request records 100.

FIG. 16 is a diagram illustrating the simultaneous playback request records 100 that are recorded on the hard disk 20. In the figure, reference numerals 101 to 110 designate records of simultaneous playback requests and request times of the file 8 and its copy 99 and the file 9 and its copy 10 from the terminal units, and numeral 111 designates a group of simultaneous playback requests that is obtained by separating the requests at a prescribed time.

Figure 17:
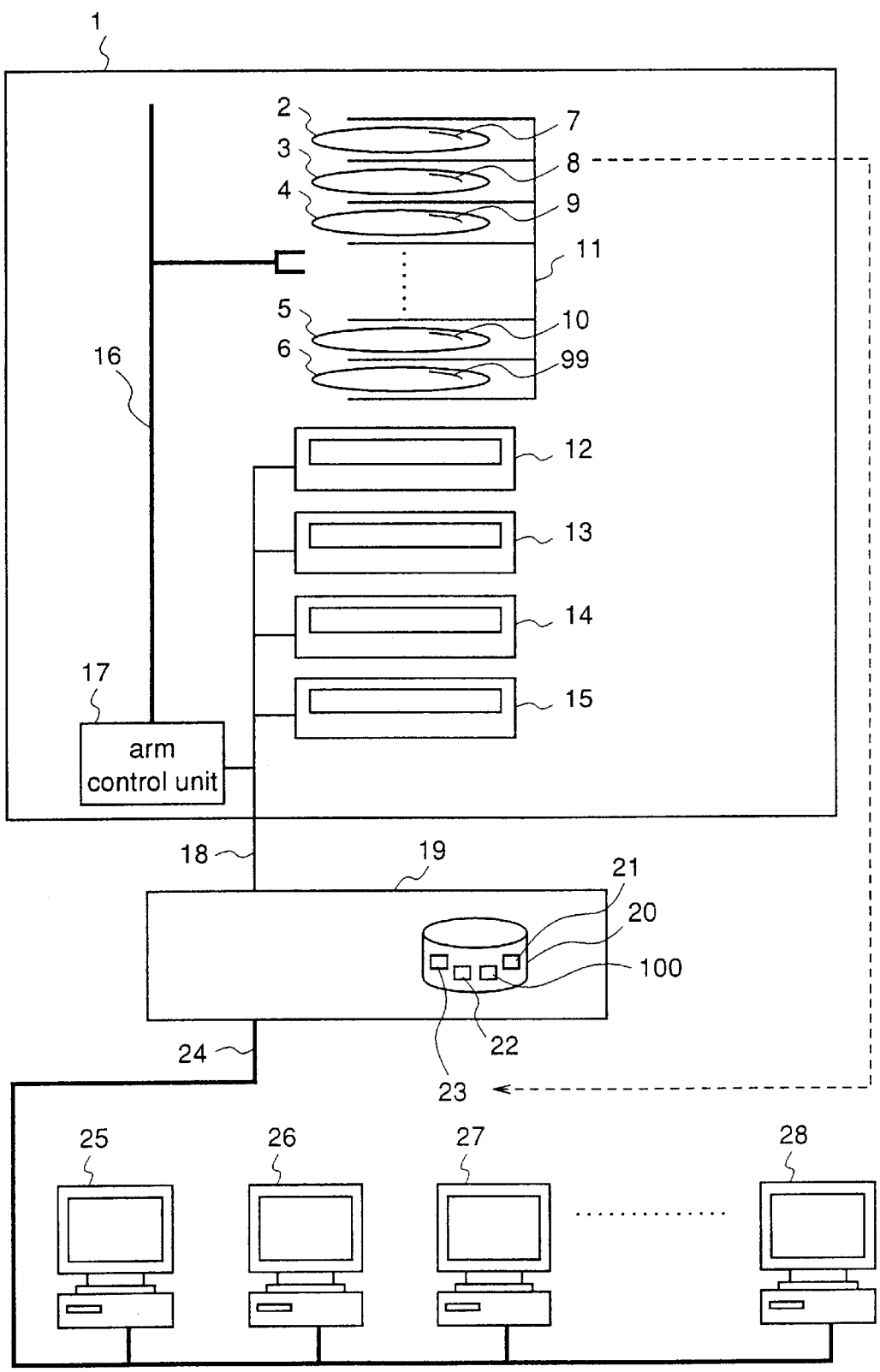
FIG. 17 is a diagram for explaining copy creation of files according to the sixth embodiment of the invention.

After a prescribed time, the playback request management unit 192 creates frequency information of the simultaneous playback requests of the respective files. In FIG. 16, in the simultaneous playback requests 111 in the prescribed time, the number of simultaneous playback requests of the file 8 and its copy is seven, and the number of simultaneous playback requests of the file 9 and its copy is three. The playback request management unit 192 outputs the frequency information to the file management unit 193. In this case, the file management unit 193 is set so that files of simultaneous playback request frequency of five or more are copied to the hard disk 20. Accordingly, as shown in figure 17, a copy 23 of the file 8 is created on the hard disk 20. After copying the file, the file management unit 193 updates the content of the file management information 22 on the hard disk 20 as in the first embodiment.

As described above, in the server for library according to the sixth embodiment of the invention, when playback requests of each file and its copy that are recorded on the disks in the library 1, from the plurality of terminal units are simultaneous, the playback request management unit 192 records these requests as simultaneous playback requests. Then, the playback request management unit 192 creates frequency information of the simultaneous playback requests at prescribed times, and the file management unit 193 copies each file according to the frequency information. In the prior art and the first to fifth embodiments of the invention, although the playback request number is recorded, there are no records about simultaneous playback requests from a plurality of terminal units. Therefore, for example, even when a file has been frequently requested from one terminal unit, it is considered from the request number that the file has received many playback requests, and the server creates a copy of the file on the hard disk or the other disk in the library. This departs from the object of accepting requests from a plurality of terminal units. Alternatively, in a case of a file that has often received requests simultaneously from a plurality of terminal units although the absolute number of the requests is not so large, when considering only the playback request number, such a file is not copied to the hard disk. As a result, the simultaneous playback requests of the file from the plurality of terminal units may be accepted eternally. In order to avoid these problems, in the sixth embodiment of the invention, the simultaneous playback requests of each file and its copy are recorded, and each file is copied to the hard disk on the basis of the records, whereby the requests from the plurality of terminal units can be accepted without producing the defects described above.

Embodiment 7

In a server for library according to a seventh embodiment of the present invention, the priority levels in creating copies of files and reading out files are set on disks to be used.

Figure 18:
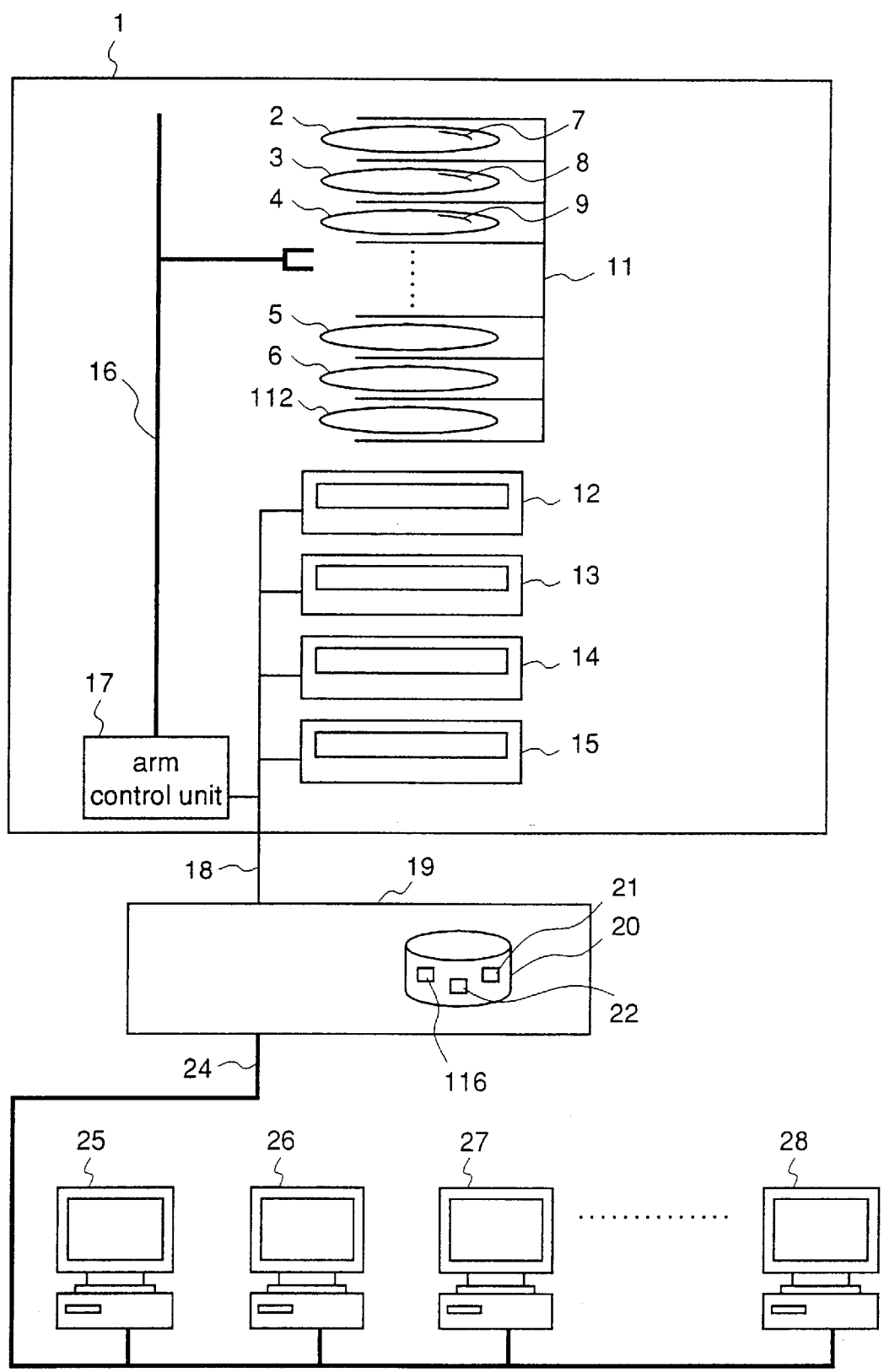
FIG. 18 is a diagram illustrating a network system in accordance with a seventh embodiment of the present invention.

FIG. 18 is a diagram illustrating a network system according to the seventh embodiment of the invention. In the figure, reference numeral 116 designates disk copy information as to which disk each file is copied to, which is recorded on the hard disk 20. The same reference numerals as those shown in FIG. 1 are identical as in the first embodiment.

Figure 19:
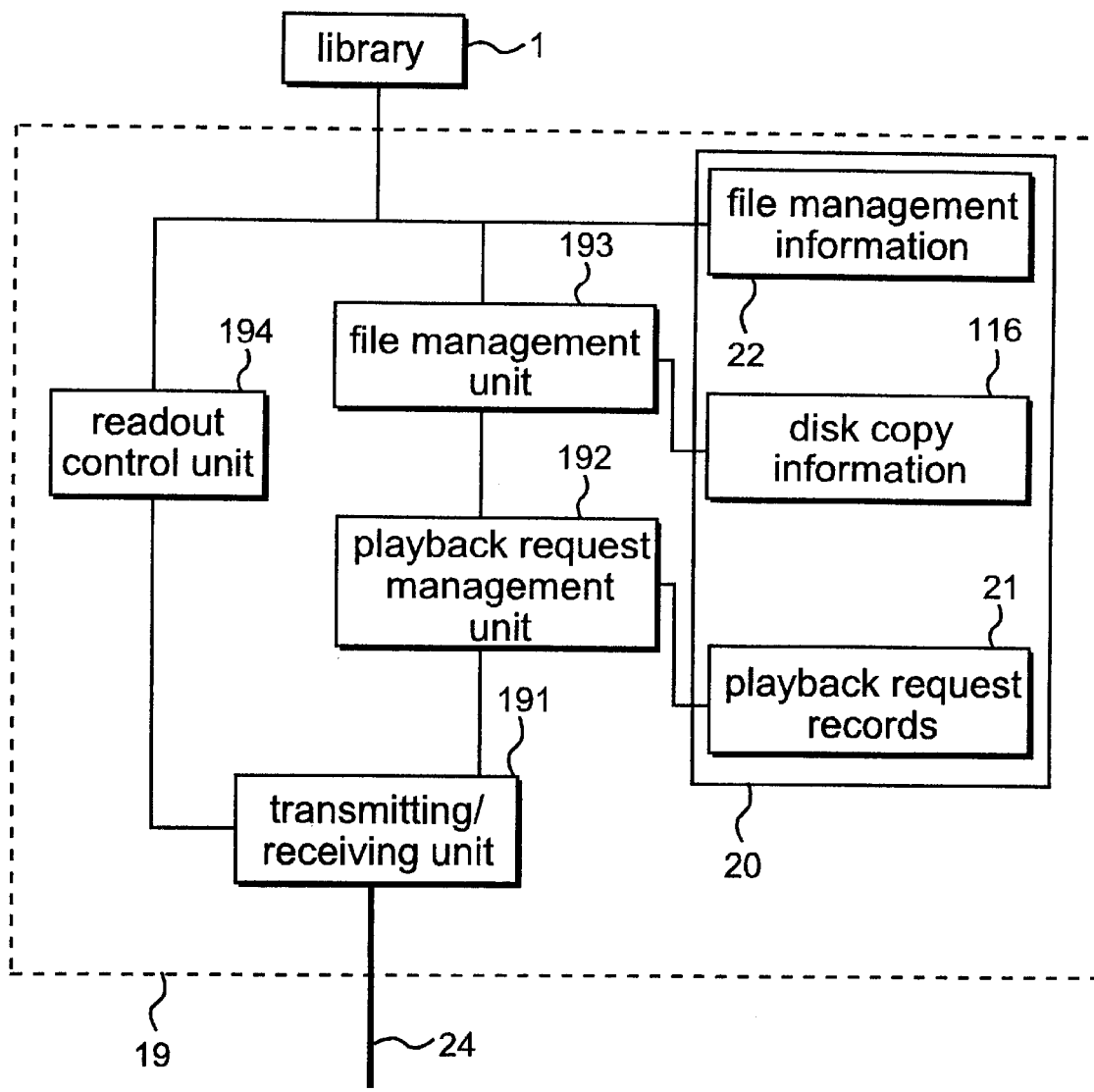
FIG. 19 is a block diagram illustrating a server for library according to the seventh embodiment of the invention.
Figure 20:
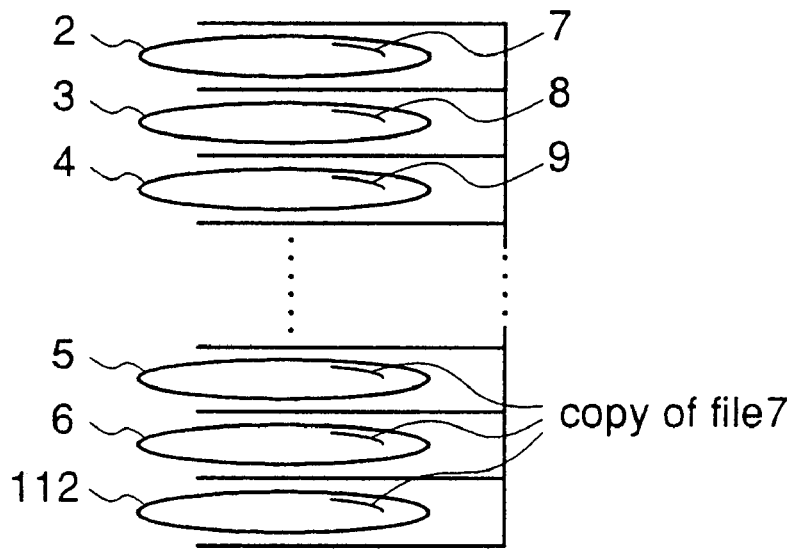
FIGS. 20(a) and 20(b) are diagrams for explaining copy creation of files in a library according to the seventh embodiment of the invention.
Figure 20:
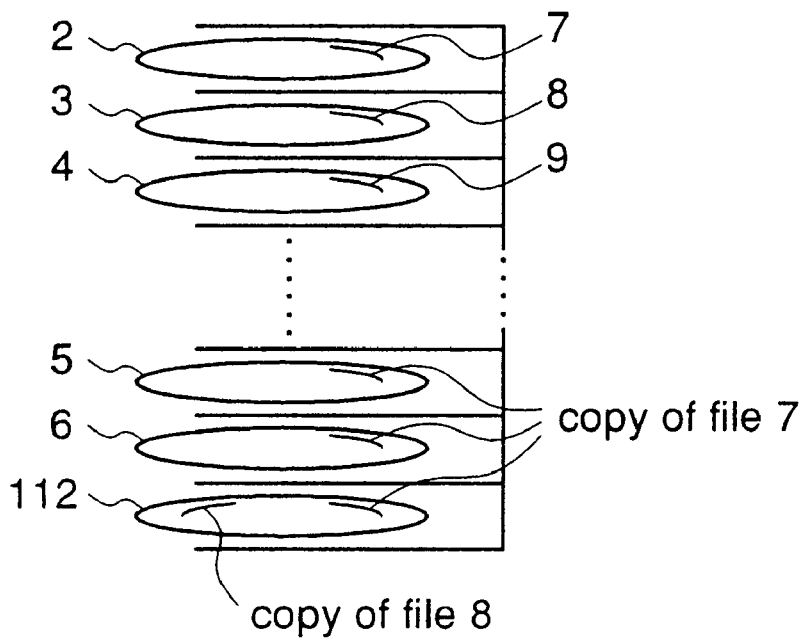

FIG. 19 is a block diagram illustrating the server for library 19. In the figure, the same reference numerals as those shown in FIG. 2 are identical as in the first embodiment, except the disk copy information 116 shown in FIG. 18. FIGS. 20(a) and 20(b) are diagrams for explaining copy creation between the disks in the library 1. FIGS. 21(a) to 21(d) are diagrams illustrating the contents of the disk copy information 116, and FIGS. 22(a) to 22(d) are diagrams illustrating the contents of the file management information 22.

In the server of the seventh embodiment, the operation of reading out and transmitting files corresponding to playback requests from the terminal units is identical as in the first embodiment. The following description will be given of the operation of creating copies of files.

Initially, there is considered the case of the server of the first embodiment. As shown in FIG. 20(a), it is found from the playback request records that the file 7 on the disk 2 has received many playback requests, and the file 7 is copied to the disks 5, 6 and 112. Thereafter, the playback request number of the file 8 on the disk 3 increases, and the file 8 is copied to the disk 112 as shown in FIG. 20(b). In this state, when the file 7 is requested simultaneously from two terminal units, since the playback order of the copies of the file 7 on the other disks 5, 6 and 112 is not determined in particular, data of the disk 2 and the disk 112 may be played back. At this time, when the file 8 is requested simultaneously from the other two terminal units, the file 8 on the disk 3 can be played back. However, since the disk 112 including the copy of the file 8 is occupied in playing back the copy of the file 7, the disk 112 cannot be used for playing back the copy of the file 8. Consequently, the requests of the file 8 from the other two terminal units are not accepted, failing to use the copy of the file 8 effectively.

In the seventh embodiment of the invention, in order to avoid this defect, the priority levels in recording and regeneration of files are set on a plurality of disks when copies of the files are created, so that playback requests from terminal units do not concentrate to a certain disk.

In the server of the seventh embodiment, there is set the disk copy information 116 to which the file management unit 193 refers in creating copies of files. In this case, the disks 5, 6 and 112 in the library 1 are for copy creation of files that receive many playback requests, and information about these three disks is recorded in the disk copy information 116 on the hard disk 20.

As shown in FIGS. 21(a) to 21(d), in the disk copy information 116, numeric values are given to the respective disks. The disk of the smaller numeric value has fewer copies, and is more appropriate for creating a new copy. When a file is copied to any of the disks, the numeric value corresponding to the disk is increased, whereby no playback requests concentrate to a certain disk.

Concerning the priority levels in file playback, as shown in FIGS. 22(a) to 22(d), the file management information 22 includes, in addition to disk names including the files and the presence of copies of the files in the hard disk, disk names including copies of the files and the priority levels of the disks in recording and playback of the files.

At the initial state, i.e., at the state in which no copies are created as shown in FIG. 18, in the disk copy information 116 shown in FIG. 21(a), the initial values of the copy information, "0" are given to the respective disks 5, 6 and 112.

When it is considered from the file playback request records that the file 7 on the disk 2 has received many playback requests, and the file 7 is copied to three disks, the file management unit 193 determines the priority levels of the disks in recording and playback. Since no files have been copied to these disks, the numeric values of the disks are all "0" as shown in FIG. 21(a). In this case, when the values of the disks are identical, the priority level becomes higher in the ascending order of the numerals of the disk names of the disks. Accordingly, the disk 5 has the highest priority level and the disk 112 has the lowest priority level.

After copying the file 7 to the three disks according to the priority levels, the file management unit 193 adds the value "3" to the copy information of the disk 5 of the highest priority level, the value "2" to the copy information of the disk 6 of the second highest priority level, and the value "1" to the copy information of the disk 112 of the lowest priority level to update the disk copy information 116 (FIG. 21(b)).

Thereafter, the file management unit 193 updates the file management information 22 on the hard disk 20. That is, since the file 7 has been copied to three disks, the disk names including the copies of the file and the priority levels of the disks in recording and playback are changed from the state shown in FIG. 22(a) to the state shown in FIG. 22(b).

Next, when the file 8 is copied to one disk according to the file playback request records, the file management unit 193 refers to the disk copy information shown in FIG. 21(b). The value of the copy information of the disk 5 is "3", the value of the disk 6 is "2", and the value of the disk 112 is "1", after copying the file 7. Therefore, the file 8 is copied to the disk 112 of the smallest value. After creating the copy of the file 8, the file management unit 193 updates the disk copy information 116 from the state shown in FIG. 21(b) to the state shown in FIG. 21(c). That is, no values are added to the copy information of the disks 5 and 6, and the value "3" added to the copy information of the disk 112 makes the value "4" because the copy of the file 8 has been created only on the disk 112.

Thereafter, the file management unit 193 updates the file management information 22. That is, since the file 8 has been copied to the disk 112, the number "1" of the disk names including the copies of the file and the priority levels of the disks in recording and playback is changed from "no copy" to "disk 12", i.e., the file management information 22 is changed from the state shown in FIG. 22(b) to the state shown in FIG. 22(c).

As in considering the case of the server of the first embodiment described above, when the file 7 is requested simultaneously from two terminal units after copying the file 8, the readout control unit 194 determines disks to be used for reading out data of the file 7, referring to the file management information 22. From the information shown in FIG. 22(c), it is found that the disks to be used are the disk 2 including the original file 7 and the disk 5 of the highest priority level among the disks including the copies of the file. At this time, when the file 8 is requested simultaneously from the other two terminal units, the readout control unit 194 determines disks to be used, referring to the file management information 22. According to the information shown in FIG. 22(c), the disk 3 including the original file 8 and the disk 112 including the copy of the file 8 are selected to be regenerated.

Further, when the file 9 is copied to one disk according to the file playback request records, the file management unit 193 refers to the disk copy information shown in FIG. 21(c). The value of the copy information of the disk 5 is "3", the value of the disk 6 is "2", and the value of the disk 112 is "4", after copying the file 8. Therefore, the file 9 is copied to the disk 6 of the smallest value.

As in creating the copy of the file 8, the file management unit 193 updates the disk copy information 116 from the state shown in FIG. 21(c) to the state shown in FIG. 21(d), and the file management information 22 from the state shown in FIG. 22(c) to the state shown in FIG. 22(d).

Consequently, after creating the copies of the files 8 and 9, even when two files are requested simultaneously from two terminal units each, the files can be played back according to the requests because the disks including the copies of the respective files are not identical.

As described above, in the server for library according to the seventh embodiment of the invention, the disk copy information 116 is recorded on the hard disk 20. The file management unit 193 sets the priority levels of disks in copy creation of files, and records the priority levels of the disks in regeneration in the file management information 22. The readout control unit 194 determines disks to be used for reading out the files, referring to the file management information. Therefore, no playback requests concentrate to a certain disk, and the copies of the files are used effectively. As a result, it is possible to prevent a decrease in number of files that can be transmitted simultaneously to a plurality of terminal units due to the concentration of the playback requests.

Embodiment 8

In a server for library according to an eighth embodiment of the present invention, copies of each file are created with file names changed in copying the file.

The server for library of the eighth embodiment of the invention has the same construction as in the first embodiment, and FIGS. 1, 2 and 5 are used for explanation. FIGS. 23(a) to 23(c) are diagrams illustrating the contents of the file management information 22 that is recorded on the hard disk 20.

In the server of the eighth embodiment, the operation of reading out and transmitting files corresponding to playback requests from the terminal units is identical as in the first embodiment. The following description will be given of the operation of creating copies of files.

At the state in which no copies have been created on the hard disk and the other disks as shown in FIG. 23(a), in the file management information 22 about the files 7 to 9, file names when copied to the hard disk, and disk names including copies of files and their file names are recorded at "no copy".

It is supposed that the file 9 is copied to the disk 5 on the basis of the file playback request records. At this time, if the file management unit 193 copies the file 9 to the disk 5 by the same name of "file 9", file file 9 on the disk 4 be cannot distinguished from the copy on the disk 5. Therefore, a new file is created on the disk 5 by the name of "file 9-DISK 5". Thereafter, the file management unit 193 changes the file management information 22 from the state shown in FIG. 23(a) to the state shown in FIG. 23(b), and updates the disk name including the copy of the file and its file name about the file 9 from "no copy" to "disk 5/file 9-DISK 5".

When the file 9 is requested simultaneously from two terminal units after copying the file 9, the readout control unit 194 initially refers to the file management information 22 shown in FIG. 23(b). Since there is described that the file 9 is recorded on the disk 4, the file 9 on the disk 4 is played back by a drive to transmit data to one terminal unit. Further, from the file management information 22, it is found that the file 9 has been copied to the disk 5 by the name of "file 9-DISK 5". Accordingly, the file 9-DISK 5 on the disk 5 is played back by another drive to transmit data to the other terminal unit. Although the file 9 and the file 9-DISK 5 have different names, the contents of these files are identical. As a result, from the two terminal units, it looks as if two files 9 are simultaneously played back.

Then, it is supposed that the file 9 is copied to the hard disk 20 on the basis of the file playback request records. As in the case of copying the file 9 to the disk 5, the file management unit 193 copies the file 9 to the hard disk 20 by the different name. In this case, a new file name of "file 9-HDD" is used. Thereafter, the file management unit 193 changes the file management information 22 from the state shown in figure 23(b) to the state shown in FIG. 23(c), and updates the file name when copied to the hard disk about the file 9 from "no copy" to "file 9-HDD".

When the file 9 is requested from the terminal units after copying the file 9 to the hard disk 20, the readout control unit 194 initially examines the file management information 22 shown in FIG. 23(c). From this information, it is found that the file 9 and its copy are recorded on the disks 4 and 5, and further, the file 9 has been copied to the hard disk 20 by the name of "file 9-HDD". Therefore, the file 9-HDD on the hard disk that can transmit data of a file simultaneously to a plurality of terminal units is played back to transmit data to the terminal units. Although the file 9 and the file 9-HDD have different names, the contents of these files are identical. As a result, from the terminal units, it looks as if a plurality of files 9 are simultaneously played back.

As described above, in the server for library according to the eighth embodiment of the invention, files that are recorded on disks in the library 1 are copied to the other disks and the hard disk 20 by the file names different from the original file names. By recording the disk names on which the copies of the files have been created and the file names of the copies in the file management information 22, the readout control unit 194 refers to the file management information in reading out and playing back data, thereby selecting appropriate files. Consequently, even when the original file and its copies are present, these files can be controlled with good efficiency.

Embodiment 9

In a server for library according to a ninth embodiment of the present invention, files in a library are copied to a hard disk in a short time by making the best of high-speed access of the hard disk.

Figure 24:
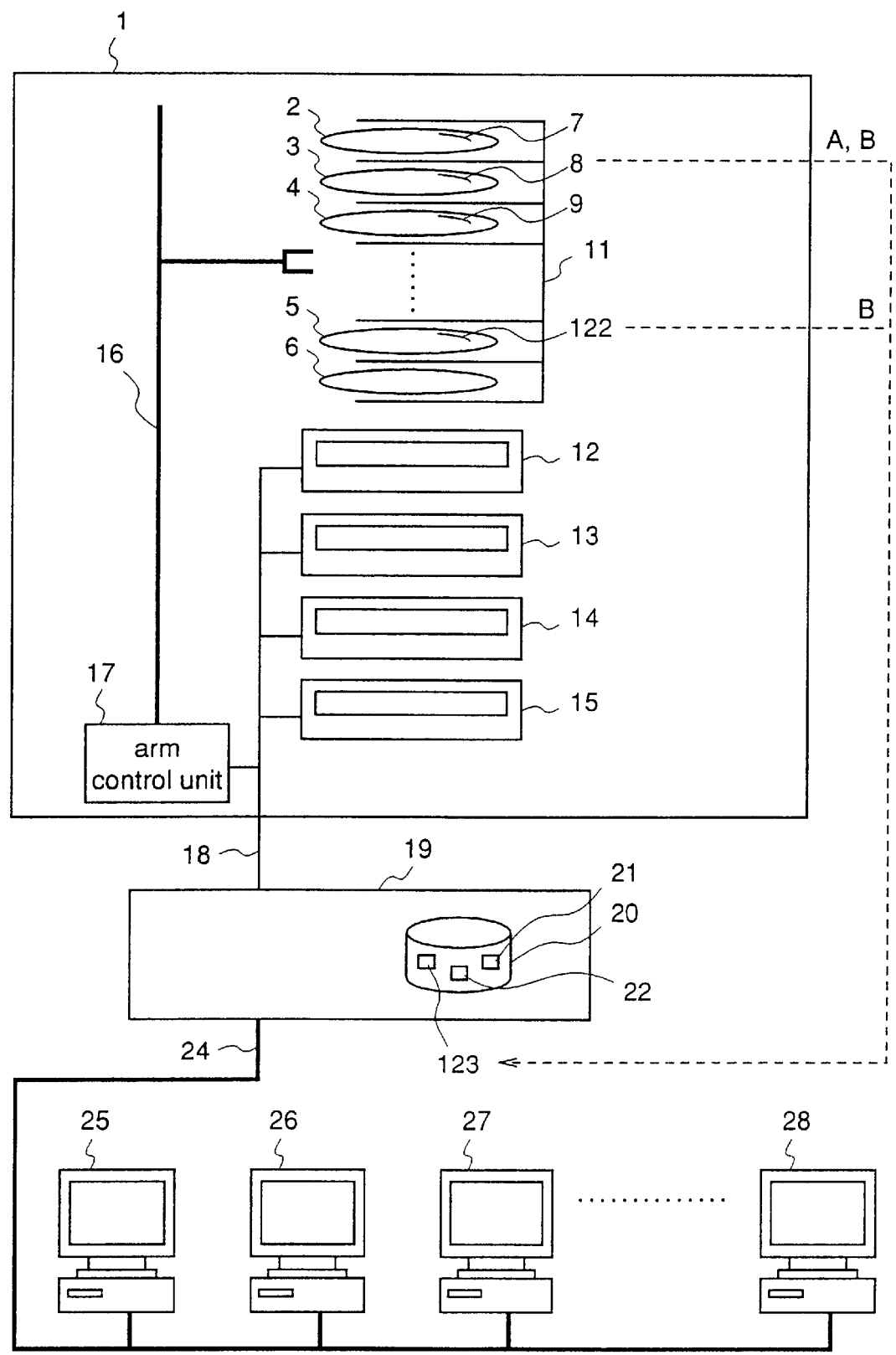
FIG. 24 is a diagram for explaining copy creation of files in accordance with a ninth embodiment of the present invention.

FIG. 24 is a diagram illustrating a network system according to the ninth embodiment of the invention. The same reference numerals as those shown in FIG. 1 are identical as in the first embodiment. The server for library of the ninth embodiment has the same construction as in the first embodiment, and FIG. 2 is used for explanation. FIGS. 25(a) and 25(b) are diagrams for explaining copy creation of files according to the ninth embodiment, and FIGS. 26(a) and 26(b) are diagrams for explaining copy creation of files according to the first embodiment.

In the server of the ninth embodiment, the operation of reading out and transmitting files corresponding to playback requests from the terminal units is identical as in the first embodiment.

As shown in FIG. 24, it is considered from the playback request records 21 that the file 8 that is recorded on the disk 3 in the library 1 has received many playback requests as described for the first embodiment, and the file 8 is copied to the other disk 5 in the library. Further, it is supposed that the file 8 receives more playback requests and is copied to the hard disk 20.

In the case of the first embodiment, as shown by "A" in FIG. 24, the file 8 on the disk 3 is always copied to the hard disk 20. The read/write speed of the disk in the library is much lower than that of the hard disk. Therefore, the time required for copying the file to the hard disk depends on the reading speed of the disk.

In the server of the ninth embodiment, when a file in the library 1 is copied to the hard disk 20, the file management unit 193 refers to the file management information 22 and examines whether a copy of the file has been created on the other disk or not. If the file has been copied, both of data from the file and its copy are copied to the hard disk in parallel as shown by "B" in FIG. 24, thereby reducing the time required for copy creation on the hard disk.

FIGS. 25(a) and 25(b) are diagrams for explaining parallel copying by the file management unit 193. When parallel copying is performed, the file management unit 193 divides each file equally into data blocks of the proper amounts. In this case, each file is divided into eight blocks 1 to 8.

As shown in FIG. 25(a), a block 1 is read out of the file 8 on the disk 3 and copied to the hard disk 20, and in parallel, a block 2 is read out of the copy of the file 8 on the disk 5 and copied to the hard disk 20. Since the access speed of a hard disk is several times as high as that of a usual disk, it is possible to copy two file data of different blocks in parallel. Assuming that the time required for reading out ⅛ data of the file 8 of each disk is t, in addition to the time t, some overhead time for writing of the data into the hard disk 20 and parallel operation is required at the state shown in FIG. 25(a). This overhead time is smaller than t, so that the time required at the state shown in FIG. 25(a) is almost t. Next, as shown in FIG. 25(b), a block 3 on the disk 3 and a block 4 on the disk 5 are copied to the hard disk 20 in parallel. Similarly, parallel copying of the other blocks is performed, and the time required in total becomes almost 4t.

FIGS. 26(a) and 26(b) illustrate the case of copying a file by the server according to the first embodiment for comparison. As shown in FIG. 26(a), the time required for copying ⅛ data of the file 8 at the head part is almost t. As shown in FIG. 26(b), ⅛ data of the file 8 at the next part also is copied at almost the time t. Similarly, copying of the other parts of the file 8 is performed, and the time required in total becomes almost 8t.

Consequently, it is found that the time required when data from two disks are copied in parallel becomes about half the time required when one disk is used.

In addition, in the ninth embodiment of the invention, although data of the identical file that have been recorded on two disks are copied to the hard disk, it is possible to copy data of the identical file that have been recorded on three disks or more to the hard disk, by setting the file management unit 193.

As described above, in the server for library according to the ninth embodiment of the invention, when a file on a disk in the library 1 is copied to the hard disk 20, the file management unit 193 refers to the file management information 22 that is recorded on the hard disk. When another disk including a copy of the file is present in the library, data from the file and its copy are copied to the hard disk in parallel, whereby the time required for copying can be exceedingly reduced by making the best of high-speed access of the hard disk.

The playback request management unit 192, the file management unit 193, and the readout control unit 194 in the server for library according to any of the first to ninth embodiments are realized by a program that functions on a personal computer or a work station employed as a usual file server device. Therefore, these units can be easily realized in a usual server device by media that can record a program, such as hard disk, optical disk, IC card, ROM cassette and the like.

What is claimed is:

1. A method of managing files in an optical disk library storing many optical disks recording data as files, comprising a plurality of playback or recording/playback devices for said data storing optical disks, and comprising a conveying device for conveying said data storing optical disks to the playback or recording/playback device to be inserted/removed, the method comprising:

recording a playback request of a file in the optical library whenever access to the file is requested;

creating frequency information of playback request of each file according to the recorded playback request;

selecting a file which is judged to have very frequent playback requests compared to other files recorded in the optical disk according to the frequency information of playback request, simultaneously at a plurality of sets of specified time intervals or when the number of the playback requests reaches a specified value; and wherein the selected file is copied in another optical disk in the optical disk library according to a weighted playback request frequency in a long term and in a short term.

2. A method for managing files in an optical disk library storing many optical disks recording data as files, comprising a plurality of playback or recording/playback devices for said data storing optical disks, and comprising a conveying device for conveying said data storing optical disks to the playback or recording/playback device to be inserted/removed, the method comprising:

recording a playback request of a file in the optical library whenever access to the file is requested;

creating frequency information of playback request of each file according to the recorded playback request;

selecting a file which is judged to have very frequent playback requests compared to other files recorded in the optical disk according to the frequency information of playback request, simultaneously at specified time intervals or when the number of the playback requests reaches a specified value;

wherein when a file is required for another playback at the same time that the file is already being played according to the playback request, this fact is recorded as a simultaneous playback request, the frequency information of said simultaneous playback request of the file is created according to said recorded simultaneous playback request; thereafter, according to said frequency information of playback request and said frequency information of simultaneous playback request, the selected file is copied in another optical disk in the optical disk library.

3. A server device for an optical disk comprising:

an optical disk library storing many optical disks recording data as files, comprising a plurality of playback or recording/playback devices for said data storing optical disks, and comprising a conveying device for conveying said data storing optical disks to the playback or recording/playback devices to be inserted/removed;

playback request management unit for recording a playback request when one terminal or more among a plurality of terminal apparatuses connected to a network requests playback of the files, and creating frequency information of the playback request from the terminal apparatus according to the record of the playback requests;

file management unit for selecting a file which is judged to have very frequent playback requests compared to other files recorded in the optical disk according to the frequency information of playback request, simultaneously at a plurality of sets of specified time intervals or when the number of the playback requests reaches a specified value; and wherein the selected file is copied in another optical disk in said optical disk library according to a weighted playback request frequency in a long term and in a short term.

4. A server device for an optical disk comprising:

an optical disk library storing many optical disks recording data as files, comprising a plurality of playback or recording/playback devices for said data storing optical disks, and comprising a conveying device for conveying said data storing optical disks to the playback or recording/playback devices to be inserted/removed;

playback request management unit for recording a playback request when one terminal or more among a plurality of terminal apparatuses connected to a network requests playback of the files, and creating frequency information of the playback request from the terminal apparatus according to the record of the playback requests;

file management unit for selecting a file which is judged to have very frequent playback requests compared to other files recorded in the optical disk according to the frequency information of playback request, simultaneously at specified time intervals or when the number of the playback requests reaches a specified value;

wherein in said playback request management unit, when a file is required for another playback at the same time the file is already being played back according to the playback request from a terminal apparatus, this fact is recorded as a simultaneous playback request, the frequency information of said simultaneous playback request of the file is created according to said recorded simultaneous playback request; thereafter, according to said frequency information of playback request and said frequency information of simultaneous playback request, the selected file is copied in another optical disk in the optical disk library.

* * * * *